US008559336B2

(12) United States Patent
Calippe et al.

(10) Patent No.: US 8,559,336 B2
(45) Date of Patent: Oct. 15, 2013

(54) METHOD AND APPARATUS FOR HINT-BASED DISCOVERY OF PATH SUPPORTING INFRASTRUCTURE

(75) Inventors: Joël R. Calippe, San Jose, CA (US); Claudio A. Ortega, Redwood City, CA (US); Gurudas Somadder, San Jose, CA (US); Hua Shu, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 138 days.

(21) Appl. No.: 13/180,825

(22) Filed: Jul. 12, 2011

(65) Prior Publication Data

US 2011/0267980 A1 Nov. 3, 2011

Related U.S. Application Data

(63) Continuation-in-part of application No. 12/696,353, filed on Jan. 29, 2010.

(51) Int. Cl.
*H04L 12/28* (2006.01)
(52) U.S. Cl.
USPC .............................. 370/254; 370/252; 370/255
(58) Field of Classification Search
None
See application file for complete search history.

(56) References Cited

U.S. PATENT DOCUMENTS

| | | | |
|---|---|---|---|
| 5,740,346 A * | 4/1998 | Wicki et al. .................. 714/22 |
| 6,868,068 B1 * | 3/2005 | Jain et al. .................... 370/252 |
| 6,912,203 B1 * | 6/2005 | Jain et al. .................... 370/252 |
| 7,111,073 B1 * | 9/2006 | Jain et al. .................... 709/241 |
| 7,310,664 B1 | 12/2007 | Merchant et al. |
| 7,324,499 B1 | 1/2008 | Borella et al. |
| 7,724,681 B2 * | 5/2010 | Lehane ........................ 370/252 |
| 8,014,273 B1 | 9/2011 | Barrett et al. |
| 2002/0116485 A1 | 8/2002 | Black et al. |
| 2002/0174207 A1 | 11/2002 | Battou |
| 2004/0253940 A1 | 12/2004 | Andrews et al. |
| 2005/0015623 A1 | 1/2005 | Williams et al. |
| 2007/0177523 A1 | 8/2007 | Nagami et al. |
| 2007/0183357 A1 | 8/2007 | Bender et al. |
| 2008/0247314 A1 | 10/2008 | Kim et al. |
| 2009/0049152 A1 | 2/2009 | Rimhagen et al. |
| 2009/0232029 A1 | 9/2009 | Abu-Hamdeh et al. |
| 2009/0257353 A1 | 10/2009 | Song et al. |
| 2009/0262707 A1 | 10/2009 | Wu et al. |
| 2009/0270099 A1 | 10/2009 | Gallagher et al. |
| 2009/0275365 A1 | 11/2009 | Lee et al. |

(Continued)

FOREIGN PATENT DOCUMENTS

| | | |
|---|---|---|
| EP | 1 976 185 A1 | 10/2008 |
| EP | 2 110 990 A1 | 10/2009 |
| WO | WO 2005/017707 A2 | 2/2005 |
| WO | WO 2009/115554 A1 | 9/2009 |

OTHER PUBLICATIONS

The International Search Report and the Written Opinion of the International Searching Authority, or the Declaration in PCT/US2011/021509, Alcatel-Lucent USA Inc., Applicant, mailed Jul. 22, 2011, 13 pages.

(Continued)

*Primary Examiner* — Robert Wilson
(74) *Attorney, Agent, or Firm* — Wall & Tong, LLP

(57) ABSTRACT

A method and apparatus for rapidly discovering unknown or unmanaged portions of network using hints defining possible transport layer infrastructure topology and the like.

20 Claims, 10 Drawing Sheets

(56) References Cited

U.S. PATENT DOCUMENTS

| | | |
|---|---|---|
| 2010/0020715 A1 | 1/2010 | Monaco et al. |
| 2010/0022263 A1 | 1/2010 | Stamoulis et al. |
| 2010/0091671 A1 | 4/2010 | Lidstrom et al. |
| 2010/0095007 A1 | 4/2010 | Cherlan et al. |
| 2010/0149971 A1 | 6/2010 | Noriega |
| 2010/0150003 A1 | 6/2010 | Andreasen et al. |
| 2010/0195621 A1 | 8/2010 | Kekki et al. |
| 2010/0208653 A1 | 8/2010 | Morinaga et al. |
| 2010/0232353 A1 | 9/2010 | Hu et al. |
| 2010/0299419 A1 | 11/2010 | Ramankutty et al. |
| 2010/0325416 A1 | 12/2010 | Haddad |
| 2010/0329150 A1 | 12/2010 | Nielsen |
| 2011/0134797 A1 | 6/2011 | Banks et al. |
| 2011/0153844 A1 | 6/2011 | Bovo et al. |
| 2011/0188403 A1* | 8/2011 | Calippe et al. ............ 370/254 |

OTHER PUBLICATIONS

The International Search Report and the Written Opinion of the International Searching Authority, or the Declaration in PCT/US2011/021468, Alcatel-Lucent, Applicant, mailed Oct. 7, 2011, 12 pages.

"$3^{rd}$ Generation Partnership Project; Technical Specification Group Core Network and Terminals; Policy and Charging Control signalling flows and QoS parameter mapping; (Release 9)", 3GPP Standard; 3GPP TS 29.213, $3^{rd}$ Generation Partnership Project (3GPP), Mobile Competence Centre; 650, Route Des Lucioles; F-06921 Sophia-Antipolis Cedex; France, No. V9.1.0, Dec. 18, 2009, pp. 1-127, XP050401209, [retrieved on Dec. 18, 2009].

"Telecommunications and Internet converged Services and Protocols for Advanced Networking (TISPAN); Requirements for QoS in a NGN; ETSI TS 181 018", 2. AVC Meeting; May 23, 1991-May 31, 1991; Paris; (CCITT SGXV Expertgroup for ATM Video Coding), LIS, Sophia Antipolis Cedex, France, vol. TISPAN, No. V2.0.0, Aug. 1, 2007, XP014040368, ISSN: 0000-0001.

The International Search Report and the Written Opinion of the International Searching Authority, or the Declaration in PCT/US2011/022009, Alcatel-Lucent USA Inc., Applicant, mailed May 17, 2011, 10 pages.

"$3^{rd}$ Generation Partnership Project; Technical Specification Group Services and System Aspects; Telecommunication management; Subscriber and equipment trace: Trace concepts and requirements (Release 9)", 3GPP Standard; 3GPP TS 32.421, $3^{rd}$ Generation Partnership Project (3GPP), Mobile Conference Centre; 650, Route Des Lucioles; F-06921 Sophia-Antipolis Cedex; France, No. v9.0.0, Dec. 30, 2009, pp. 1-33, XP050401686.

"$3^{rd}$ Generation Partnership Project; Technical Specification Group Services and System Aspects; Telecommunication management; Subscriber and equipment trace; Trace control and configuration management (Release 9)", 3GPP Standard; 3GPP TS 32.422, $3^{rd}$ Generation Partnership Project (3GPP), Mobile Competence Centre; 650, Route Des Lucioles; F-06921 Sophia-Antipolis Cedex; France, No. V9.0.1, Jan. 6, 2010, pp. 1-82, XP050401807.

* cited by examiner

400

700

METHOD AND APPARATUS FOR HINT-BASED DISCOVERY OF PATH SUPPORTING INFRASTRUCTURE

CROSS REFERENCE TO RELATED APPLICATIONS

This application is a continuation in part of U.S. patent application Ser. No. 12/696,353, filed Jan. 29, 2010, entitled "Method and Apparatus for Analyzing Mobile Services Delivery," which application is incorporated herein by reference.

FIELD OF THE INVENTION

The invention relates generally to the field of communication network management and, more specifically but not exclusively, to management of wireless communication networks.

BACKGROUND

Various networks such as Fourth Generation (4G) wireless networks support large numbers of wireless subscribers running one or more applications. Traffic is packetized and transported via IP networks according to multiple network elements utilizing different transport technologies, applied quality-of-service (QoS) policies and so on. Such networks are inherently complex and present new challenges to network service providers and the network management tools they rely upon to ensure consistent delivery of high-quality services to their mobile subscribers.

Managing large networks such as LTE (Long Term Evolution) networks supporting tens of thousands of mobile services requires detailed knowledge of the transport layer elements supporting the mobile service paths such as Evolved Packet System/Solution (EPS) paths as well as other non-EPS paths (generically described herein as paths). Existing techniques for managing these networks become very cumbersome as networks scale up in size.

SUMMARY

These and various other deficiencies of the prior art are addressed by a method and apparatus for analyzing mobile services delivery to provide a coherent, path-based awareness of the mobile services and the corresponding underlying transport elements supporting each service or path.

Within the context of managing or discovering transport layer elements associated with an unknown or unmanaged network (e.g., an unmanaged L2/L3 network), a first or default set of hints is provided to assist in the discovery/management functions. The default set of hints represents, in one example, a set of likely or expected set of topologies to be used within the unknown network portion.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the Figures.

DETAILED DESCRIPTION

A management capability is provided for managing a Fourth Generation (4G) Long Term Evolution (LTE) wireless network. The management capability may include one or more of an analyzer tool, an audit tool, a trace tool, an enforcement tool, and the like, as well as combinations thereof. Although primarily depicted and described herein within the context of providing management functions within a 4G LTE wireless network, it will be appreciated that the management functions depicted and described herein may be utilized within other types of wireless networks.

Figure 1:
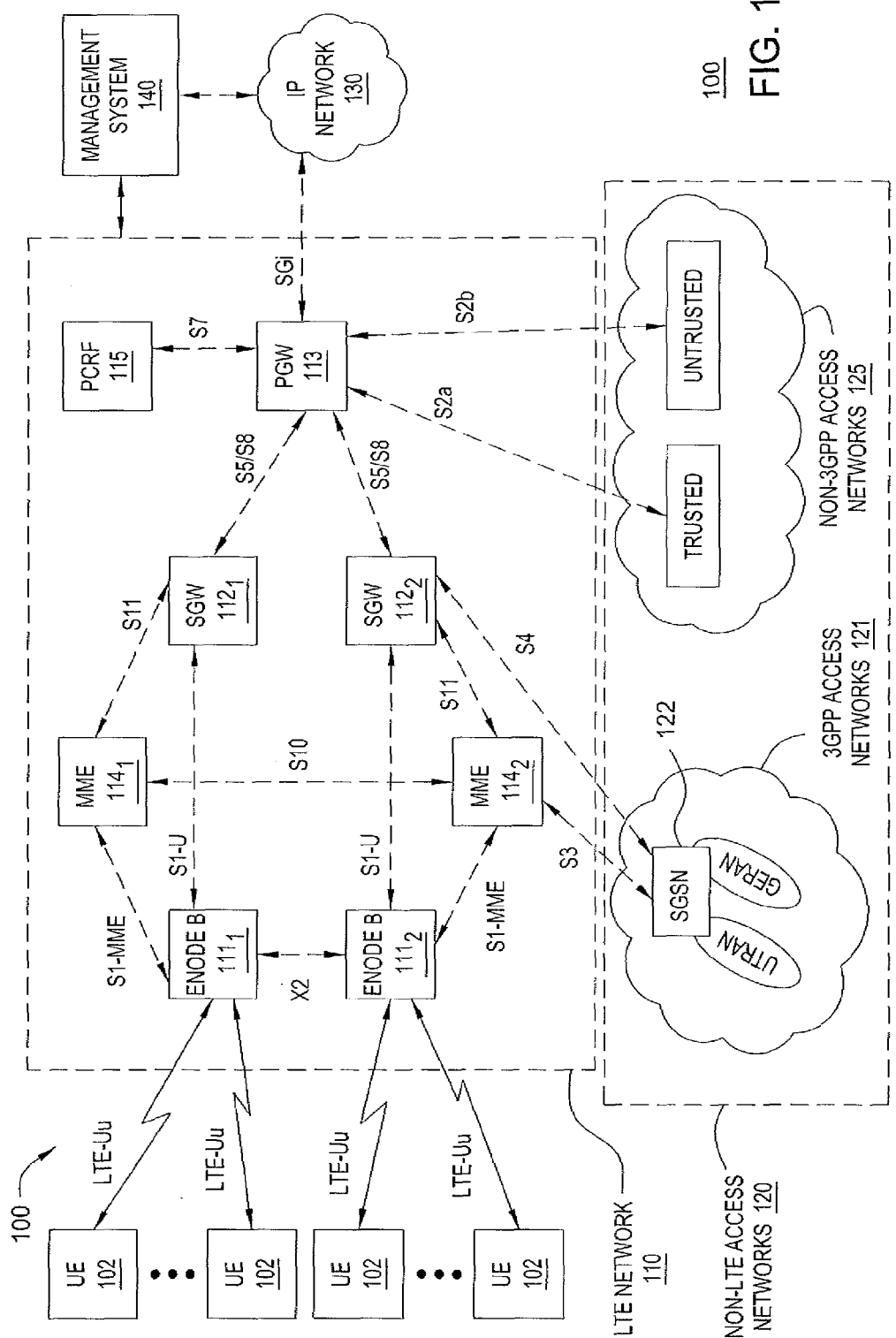
FIG. 1 depicts an exemplary wireless communication system including a management system for managing a wireless communication network.

FIG. 1 depicts an exemplary wireless communication system including a management system for managing a wireless network. Specifically, FIG. 1 depicts an exemplary wireless communication system 100 that includes a plurality of User Equipments (UEs) or User Devices (UDs) 102, a Long Term Evolution (LTE) network 110, non-LTE access networks 120, IP networks 130, and a management system (MS) 140. The LTE network 110 supports communications between the UEs 102 and IP networks 130. The non-LTE access networks 120 interface with LTE network 110 for enabling UEs associated with non-LTE access networks 120 to utilize the LTE network 110 to access IP networks 130. The MS 140 is configured for supporting various management functions for LTE network 110.

The UEs 102 are wireless user devices capable of accessing a wireless network, such as LTE network 110. The UEs 102 are capable of supporting one or more bearer sessions to IP networks 130 via LTE network 110. The UEs 102 are capable of supporting control signaling in support of the bearer session(s). The UEs 102 each may have one or more identifiers associated therewith. For example, a UE 102 may have one or more of an International Mobile Subscriber Identity (IMSI), an International Mobile Equipment Identity (IMEI), and like identifiers or identities associated therewith. For example, each of the UEs 102 may be a phone, PDA, computer, or any other wireless user device. Multiple UDs are typically active at all times for each eNodeB.

The LTE network 110 is an exemplary LTE network. The configuration and operation of LTE networks will be understood by one skilled in the art. However, for purposes of completeness, a description of general features of LTE networks is provided herein within the context of exemplary wireless communication system 100.

The LTE network 110 includes two eNodeBs 111₁ and 111₂ (collectively, eNodeBs 111), two Serving Gateways (SGWs) 112₁ and 112₂ (collectively, SGWs 112), a Packet Data Network (PDN) Gateway (PGW) 113, two Mobility Management Entities (MMEs) 114₁ and 114₂ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102. The eNodeBs 111 may support any functions suitable for being supported by an eNodeB, such as providing an LTE air interface for the UEs 102, performing radio resource management, facilitating communications between UEs 102 and SGWs 112, maintaining mappings between the LTE-Uu interfaces and S1-u interfaces supported between the eNodeBs 111 and the SGWs 112, and the like, as well as combinations thereof.

The SGWs 112 support communications for eNodeBs 111. As depicted in FIG. 1, SGW 112₁ supports communications for eNodeB 111₁ and SGW 112₂ supports communications for eNodeB 111₂. The communication between the SGWs 112 and the eNodeBs 111 is supported using respective S1-u interfaces. The S1-u interfaces support per-bearer user plane tunneling and inter-eNodeB path switching during handover. The S1-u interfaces may use any suitable protocol, e.g., the GPRS Tunneling Protocol-User Place (GTP-U). The SGWs 112 may support any functions suitable for being supported by an SGW, such as routing and forwarding user data packets (e.g., facilitating communications between eNodeBs 111 and PGW 113, maintaining mappings between the S1-u interfaces and S5/S8 interfaces supported between the SGWs 112 and PGWs 113, and the like), functioning as a mobility anchor for UEs during inter-eNodeB handovers, functioning as a mobility anchor between LTE and other 3GPP technologies, and the like, as well as combinations thereof.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which are Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The S5/S8 interfaces may utilize any suitable protocol (e.g., the GPRS Tunneling Protocol (GTP), Mobile Proxy IP (MPIP), and the like, as well as combinations thereof). The PGW 113 facilitates communications between LTE network 110 and IP networks 130 via an SGi interface. The PGW 113 may support any functions suitable for being supported by an PGW, such as providing packet filtering, providing policy enforcement, functioning as a mobility anchor between 3GPP and non-3GPP technologies, and the like, as well as combinations thereof.

The MMEs 114 provide mobility management functions in support of mobility of UEs 102. The MMEs 114 support the eNodeBs 111. The MME 114₁ supports eNodeB 111₁ and the MME 114₂ supports eNodeB 111₂. The communication between MMEs 114 and eNodeBs 111 is supported using respective S1-MME interfaces, which provide control plane protocols for communication between the MMEs 114 and the eNodeBs 111. The S1-MME interfaces may use any suitable protocol or combination of protocol. For example, the S1-MME interfaces may use the Radio Access Network Application Part (eRANAP) protocol while using the Stream Control Transmission Protocol (SCTP) for transport. The MMEs 114 support the SGW 112. The MME 114₁ supports SGW 112₁ and the MME 114₂ supports SGW 112₂. The communication between MMEs 114 and SGWs 112 is supported using respective S11 interfaces. The MMEs 114₁ and 114₂ communicate using an S10 interface. The MMEs 114 may support any functions suitable for being supported by a MME, such selecting SGWs for UEs at time of initial attachment by the UEs and at time of intra-LTE handovers, providing idle-mode UE tracking and paging procedures, bearer activation/deactivation processes, providing support for Non-Access Stratum (NAS) signaling (e.g., terminating NAS signaling, ciphering/integrity protection for NAS signaling, and the like), lawful interception of signaling, and the like, as well as combinations thereof. The MMEs 114 also may communicate with a Home Subscriber Server (HSS) using an S6a interface for authenticating users (the HSS and the associated S6a interface are omitted for purposes of clarity).

The PCRF 115 provides dynamic management capabilities by which the service provider may manage rules related to services provided via LTE network 110 and rules related to charging for services provided via LTE network 110. For example, rules related to services provided via LTE network 110 may include rules for bearer control (e.g., controlling acceptance, rejection, and termination of bearers, controlling QoS for bearers, and the like), service flow control (e.g., controlling acceptance, rejection, and termination of service flows, controlling QoS for service flows, and the like), and the like, as well as combinations thereof. For example, rules related to charging for services provided via LTE network 110 may include rules related to online charging (e.g., time-based charging, volume-based charging, event-based charging, and the like, which may depend on factors such as the type of service for which charging is being provided), offline charging (e.g., such as for checking subscriber balances before services are provided and other associated functions), and the like, as well as combinations thereof. The PCRF 115 communicates with PGW 113 using a S7 interface. The S7 interface supports transfer of rules from PCRF 115 to a Policy and Charging Enforcement Function (PCEF) supported by PGW 113, which provides enforcement of the policy and charging rules specified on PCRF 115.

As depicted in FIG. 1, elements of LTE network 110 communicate via interfaces between the elements. The interfaces described with respect to LTE network 110 also may be referred to as sessions. For example, the communication between eNodeBs and SGWs is provided via S1-u sessions, communication between SGWs and PGWs is provided via S5/S8 sessions, and so forth, as depicted in FIG. 1 and described herein. The sessions of LTE network 110 may be referred to more generally as S* sessions. It will be appreciated that each session S* that is depicted in FIG. 1 represents a communication path between the respective network elements connected by the session and, thus, that any suitable underlying communication capabilities may be used to support the session S* between the network elements. For example, a session S* may be supported using anything from direct hardwired connections to full network connectivity (e.g., where the session S* is transported via one or more networks utilizing nodes, links, protocols, and any other communications capabilities for supporting the communication path) and anything in between, or any other suitable communications capabilities.

For example, an S1-u session between an eNodeB 111 and an SGW 112 may be supported using an Internet Protocol (IP)/Multiprotocol Label Switching (MPLS) transport capability including mobile backhaul elements associated with the eNodeB 111 (e.g., using service aware routers (SARs), service access switches (SAS), and the like) and mobile backhaul elements associated with the SGW 112 (e.g., multiservice edge routers and/or other similar elements), as well as an IP/MPLS aggregation network facilitating communications between the mobile backhaul elements associated with the eNodeB 111 and the mobile backhaul elements associated with the SGW 112). Similarly, an S1-u session between an eNodeB 111 and an SGW 112 may be supported using an IP routing network using a routing protocol (e.g., Open Shortest Path First (OSPF), Intermediate System to Intermediate System (ISIS) and the like). The types of underlying communications capabilities which may be utilized to support each of the different types of sessions of LTE network 110 will be understood by one skilled in the art.

The LTE network 110 supports access to IP networks 130 from non-LTE networks 120.

The non-LTE networks 120 with which the LTE network 110 may interface include 3GPP access networks 121. The 3GPP access networks 121 may include any 3GPP access networks suitable for interfacing with LTE network 110 (e.g., 2.5G networks, 3G networks, 3.5G networks, and the like). For example, the 3GPP access networks 121 may include Global System for Mobile (GSM) Enhanced Data Rates for GSM Evolution (EDGE) Radio Access Networks (GERANs), Universal Mobile Telecommunications System (UMTS) Terrestrial Radio Access Networks (UTRANs), or any other 3GPP access networks suitable for interfacing with LTE, and the like, as well as combinations thereof.

The LTE network 110 interfaces with 3GPP access networks 121 via a Serving General Packet Radio Service (GPRS) Support Node (SGSN) 122. The MME $114_2$ supports control plane functionality for mobility between LTE network 110 and 3GPP access networks 121 using communication with SGSN 122 via an S3 interface. For example, the S3 interface enables user and bearer information exchange for 3GPP network access mobility in idle and/or active state. The SGW $112_2$ supports user plane functionality for mobility between LTE network 110 and 3GPP access networks 121 using communication with SGSN 122 via an S4 interface. For example, the S4 interface provides the user plane with related control and mobility support between SGSN 122 and SGW $112_2$.

The non-LTE networks with which the LTE network may interface include non-3GPP access networks 125. The non-3GPP access networks 125 may include any non-3GPP access networks suitable for interfacing with LTE network 110. For example, the non-3GPP access networks may include 3GPP2 access networks (e.g., Code Division Multiple Access 2000 (CDMA 2000) networks and other 3GPP2 access networks), Wireless Local Area Networks (WLANs), and the like. The support for mobility between the LTE network 110 and the non-3GPP access networks 125 may be provided using any suitable interface(s), such as one or more of the S2a interface, the S2b interface, the S2c interface, and the like, as well as combinations thereof. The S2a interface provides control and mobility support to the user plane for trusted non-3GPP access to the LTE network. The S2a interface may provide access for trusted non-3GPP networks using any suitable protocol(s), such as MPIP, Client Mobile IPv4 Foreign Agent (FA) mode (e.g., for trusted non-3GPP access that does not support MPIP), and the like, as well as combinations thereof. The S2b interface provides control and mobility support to the user plane for non-trusted non-3GPP access to the LTE network. The S2b interface may be provided an interface between PGW 113 and an evolved Packet Data Gateway (ePDG) associated with the non-trusted non-3GPP access network. The S2b interface may use any suitable protocol, such as MPIP or any other suitable protocols. The S2c interface provides control and mobility support to the user plane for providing UEs access to PGW 113 via trusted and/or non-trusted 3GPP access using one or more protocols based on Client Mobile IP co-located mode.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like. For example, the IP networks 130 include an IP Core network and, optionally, one or more other IP networks (e.g., IP Multimedia Subsystem (IMS) networks and the like). The IP networks 130 support bearer and control functions in support of services provided to UEs 102 via LTE network 110. The IP Core network is capable of providing any functions which may be provided by such a core network. The IP Core network is a packet data network via which UEs 102 may access content, services, and the like.

The IMS network is capable of providing any functions which may be provided by an IMS network.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP network networks 130. In one embodiment, for example, MS 140 may communicate with LTE network 110 via a communication path 142 which via IP network networks 130. The communication paths 141 and 142 may be implemented using any suitable communications capabilities. An exemplary management system suitable for use as MS 140 of FIG. 1 is depicted and described with respect to FIG. 2.

As depicted and described herein, the communication system 100 is merely exemplary. It will be appreciated that, although depicted and described herein with respect to specific numbers and arrangements of eNodeBs 111, SGWs 112, PGW 113, MMEs 114, and PCRF 115, an LTE wireless network may be implemented using different numbers and/or arrangements of eNodeBs 111, SGWs 112, PGW 113, MMEs 114, and PCRF 115. For example, LTE networks are typically implemented hierarchically, such as where the LTE network includes one or more PGWs, each of the PGWs supports respective pluralities of SGWs, and each of the SGWs supports respective pluralities of eNodeBs. It will be further appreciated that, although depicted and described herein with respect to an LTE wireless network that supports specific types of interfaces (namely, the S* interfaces, as well as other non-S interfaces), many other types of interfaces may be supported between elements of an LTE wireless network and/or between components of an LTE wireless network and components of non-LTE wireless networks. As such, management functions depicted and described herein are not limited to use in any particular configuration of an LTE wireless network.

Figure 2:
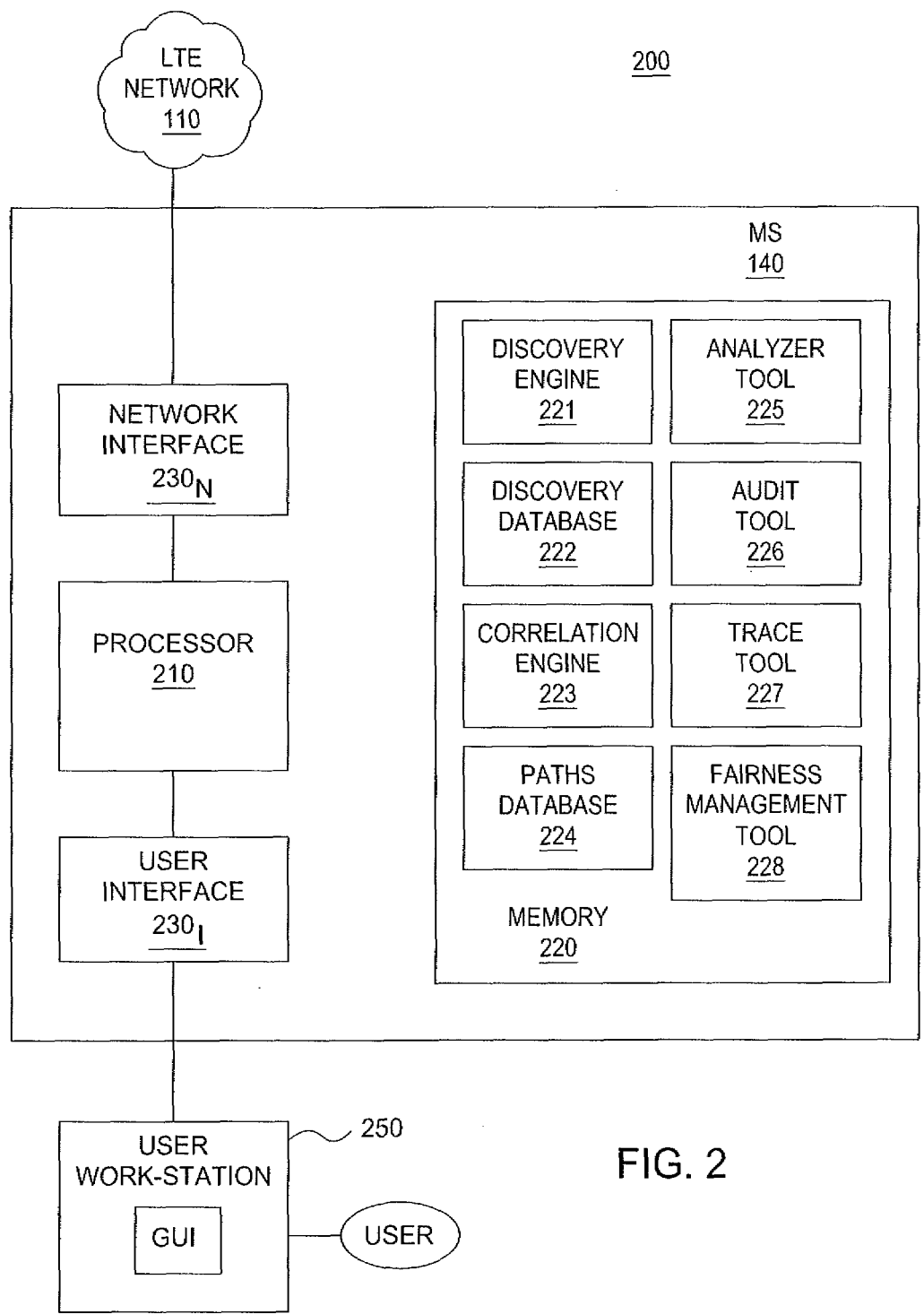
FIG. 2 depicts an exemplary management system suitable for use as the management system of FIG. 1.

FIG. 2 depicts an exemplary management system suitable for use as the management system of FIG. 1. As depicted in FIG. 2, MS 140 includes a processor 210, a memory 220, a network interface 230$_N$, and a user interface 230$_1$. The processor 210 is coupled to each of the memory 220, the network interface 230$_N$, and the user interface 230$_1$.

The processor 210 is adapted to cooperate with the memory 220, the network interface 230$_N$, the user interface 230$_1$, and the support circuits 240 to provide various management functions for LTE network 110.

The memory 220, generally speaking, stores data and tools that are adapted for use in providing various management functions for LTE network 110. The memory includes a Discovery Engine (DE) 221, a Discovery Database (DD) 222, a Correlation Engine (CE) 223, a Paths Database (PD) 224, an Analyzer Tool (ANT) 225, an Audit Tool (AUT) 226, a Trace Tool (TT) 227, and a Fairness Management Tool (FMT) 228.

In one embodiment, the DE 221, CE 223, ANT 225, AUT 226, TT 227, and FMT 228 are implemented using software instructions which may be executed by processor (e.g., processor 210) for performing the various management functions depicted and described herein.

The DD 222 and PD 224 each store data which may be generated by and used by various ones and/or combinations of the engines and tools of memory 220. The DD 222 and PD 224 may be combined into a single database or may be implemented as respective databases. Either of the combined or respective databases may be implemented as single databases or multiple databases in any of the arrangements known to those skilled in the art.

Although depicted and described with respect to an embodiment in which each of the engines, databases, and tools is stored within memory 220, it will be appreciated by those skilled in the art that the engines, databases, and/or tools may be stored in one or more other storage devices internal to MS 140 and/or external to MS 140. The engines, databases, and/or tools may be distributed across any suitable numbers and/or types of storage devices internal and/or external to MS 140. The memory 220, including each of the engines, databases, and tools of memory 220, is described in additional detail herein below.

The network interface 230$_N$ is adapted to facilitate communications with LTE network 110. For example, network interface 230$_N$ is adapted to receive information from LTE network 110 (e.g., discovery information adapted for use in determining the topology of LTE network, results of test initiated by MS 140 to LTE network 110, and the like, as well as any other information which may be received by MS 140 from LTE network 110 in support of the management functions performed by MS 140). Similarly, for example, network interface 230$_N$ is adapted to transmit information to LTE network 110 (e.g., discovery requests for discovering information adapted for use by MS 140 in determining the topology of LTE network, audits request for auditing portions of LTE network 110, and the like, as well as any other information which may be transmitted by MS 140 to LTE network 110 in support of the management functions performed by MS 140).

The user interface 230$_1$ is adapted to facilitate communications with one or more user workstations (illustratively, user workstation 250), for enabling one or more users to perform management functions for LTE network 110. The communications include communications to user workstation 250 (e.g., for presenting imagery generated by MS 140) and communications from user workstation 250 (e.g., for receiving user interactions with information presented via user workstation 250). Although primarily depicted and described as a direct connection between MS 140 and user workstation 250, it will be appreciated that the connection between MS 140 and user workstation 250 may be provided using any suitable underlying communication capabilities, such that user workstation 250 may be located proximate to MS 140 (e.g., such as where both MS 140 and user workstation 250 are located within a Network Operations Center (NOC)) or remote from MS 140 (e.g., such as where communications between MS 140 and user workstation 250 may be transported over long distances).

Although primarily depicted and described herein with respect to one user workstation, it will be appreciated that MS 140 may communicate with any suitable number of user workstations, such that any number of users may perform management functions for LTE network 110 (e.g., such as where a team of technicians at a NOC access MS 140 via respective user workstations for performing various management functions for LTE network 110). Although primarily depicted and described with respect to user workstations, it will be appreciated that user interface 230$_1$ may be adapted to support communications with any other devices suitable for use in managing LTE network 110 via MS 140 (e.g., for displaying imagery generated by MS 140 on one or more common NOC display screens, for enabling remote Virtual Private Network (VPN) access to MS 140 by users via remote computers, and the like, as well as various combinations thereof). The use of user workstations to perform management functions via interaction with a management system will be understood by one skilled in the art.

As described herein, memory 220 includes the DE 221, DD 222, CE 223, PD 224, ANT 225, AUT 226, TT 227, and FMT 228, which cooperate to provide the various management functions depicted and described herein. Although primarily depicted and described herein with respect to specific functions being performed by and/or using specific ones of the engines, databases, and/or tools of memory 220, it will be appreciated that any of the management functions depicted and described herein may be performed by and/or using any one or more of the engines, databases, and/or tools of memory 220.

The engines and tools may be activated in any suitable manner. In one embodiment, for example, the engines and tools may be activated in response to manual requests initiated by users via user workstations, in response to automated requests initiated by MS 140, and the like, as well as various combinations thereof.

For example, where an engine or tool is activated automatically, the engine or tool may be activated in response to scheduled requests, in response to requests initiated by MS 140 based on processing performed at MS 140 (e.g., such as where results generated by CE 223 indicate that ANT 225 should be invoked, such as where results of an audit performed by ANT 225 indicate that the TT 227 should be invoked, such as where results of a mobile session path trace performed by TT indicate that FMT 228 should be invoked, and the like, as well as combinations thereof). A description of the engines, databases, and tools of MS 140 follows.

In one embodiment, where an automatically triggered engine or tool begins to consume computing or other resources above a threshold level, subsequent automatic triggering of the engine or tool is constrained. In this embodiment, an alarm or status indicator is provided to the network manager indicative of the constrained automatic triggering condition such that the network manager or operating personnel may assume direct or manual control of the engine or tool.

EPS-Path to Infrastructure Correlation.

As previously noted, various embodiments of an LTE network 110 include an Evolved Packet System/Solution (EPS) infrastructure having EPS nodes (e.g., eNodeBs 111, SGWs 112, PGW 113, MMEs 114, and PCRF 115) and EPS-related interconnectivity (e.g., S* interfaces, the G* interfaces, and the like). Within the context of this present disclosure, the EPS-related interfaces are referred to herein as EPS-related paths or simply paths.

The infrastructure is architected to provide the appropriate and necessary EPS nodes for supporting the wireless services offered by the network service provider. The network service provider manages the network to provide its service offerings to its wireless/mobile users in a manner consistent with the consumer expectations. For example, wireless/mobile users (e.g., users of standard telephones, smart phones, computers and the like purchasing various voice, data or other service offerings) expect near perfect telephone/voice service, very near perfect data services, glitch-free streaming media and the like. Third party service providers purchasing service bundles for their own users expect the same, as well as management level interfaces and other mechanisms to provide interoperability between the various networks. Customer expectations may comprise an assumed or expected level of service, a level of service defined in a service level agreement (SLA) and the like.

Various embodiments are directed to network management systems and tools wherein each EPS-related interconnection is correlated to the specific infrastructure necessary to support that functionality. That is, for each EPS-related path, an association is made to the specific infrastructure necessary to support that path, including the network elements, sub-elements, links and so on which, if they fail or degrade, will result in failure or degradation of the associated EPS-related path.

By understanding which traffic flows or paths include an element, sub element or link as a necessary support element, the network management system can then know which traffic flows or paths are impacted by the degradation/failure of a specific element, sub element or link. This is especially useful in the context of an analysis tool, as will be discussed in more detail elsewhere.

Similarly, by understanding which traffic flow or path has failed or degraded, the network management system can then identify which elements, sub elements or links are necessary to support the traffic flow or path. In this manner, the network manager reduces the complexity of identifying the element(s), sub-element(s) and/or link(s) that failed/degraded element or sub element associated with the traffic flow or path that failed or degraded. This is especially useful in the context of a trace tool, as well be discussed in more detail elsewhere.

Within the context of correlation, the management system may create a service representation for each connection between a network element or sub-element.

For example, if a specific output port of a first network element transmits data to a destination address associated with a second network element, and a specific input port of the second network element receives data from a source address associated with the first network element, the service aware manager creates a service representation indicating that the specific output port of the first network element and specific input port of the second network element are connected. If either of the ports associated with the service representation fails or degrades, then the service supported by the packet flow between the specific ports will also fail or degrade. However, either of the network elements having ports associated with the service representation would normally not detect a failure of the other network element. In the event of a failure of the transmitting port of the first network element, the second network element would not necessarily realize that a failure has occurred. Similarly, in the event of a failure of the receiving port of the second network element, the first network element would not necessarily realize that a failure has occurred.

In various embodiments, a connection is provided between ports at either or both of the physical level (e.g., a cable or other physical level link) or the service level (e.g., a generalized cloud or other service level link).

In one physical level connection embodiment, if a port (or other subelement) on a first network element (NE) fails, then a corresponding or connected port (or other subelement) on a second NE will show a link down status (LLDP). In this manner, the second NE is aware of the failure of the first NE. In other physical level connection embodiment, such awareness is provided within the context of neighboring network elements, such as routers or switches and/or their various subelements.

In one service level embodiment, a port (or other subelement) on a first NE may be connected directly to a port (or other subelement) on a second NE, or through one or more ports (or other subelements) of one or more NEs (i.e., multiple hops between the first and second NEs). In this embodiment, if the port (or other subelement) on the first or any intermediate NE fails or degrades, the management system may not be aware that the failure/degradation exists due to the operational status of the last NE in the sequence of NEs. However, due to the management techniques and tool discussed herein, the network manager is made aware of the initial or intermediate failure/degradation. Various causes of this behavior include congestion, local/regional rerouting and the like. In brief, status indicators are green (indicative of appropriate operation), but the performance of this portion of the network is constrained or degraded. This constrained or degraded network operation is correlated and illustrated by the various embodiments discussed herein.

Discovery Tool/Function

The discovery engine (DE) 221 is generally adapted for providing network discovery functions for discovering information about LTE network 110. Generally speaking, the DE 221 performs a discovery process in which configuration information, status/operating information and connection information regarding the elements and sub-elements forming the network is gathered, retrieved, inferred and/or generated as will be discussed in more detail below.

The discovery process may be dynamic in that the underlying elements, sub-elements and links within the LTE network may change over time due to local network adaptations, rerouting, failures, degradations, scheduled maintenance and the like. Thus, the DE 221 may be invoked after a network change is detected or caused by any of the ANT 225, AUT 226, TT 227, and FMT 228.

At a first discovery level, the network management system (NMS) uses any legacy database information to discover the various elements (and the corresponding sub-elements) forming the network to be managed. That is, some of this discovery comprises the use of existing database information which provides a general blueprint of the network to be managed. Information in such a database includes information associated with the major functional elements forming a network, the major pipes or conduits established within the network and so on. While such information may be extremely detailed, the information does not reflect path-level network operation.

At a second discovery level, the network management system requests configuration information, status/operating information and connection information from each of the network elements within the managed network. The requested information includes information useful in determining the specific switches, ports, buffers, protocols and the like within the network elements that support the various traffic flows.

The network management system may also utilize the existing database information to infer possible connections between network elements and sub-elements and connections within the network being managed. For example, the existing database information may be constructed as depicting a sequence of connected network elements that may support traffic flows between them. However, the existing database information likely does not include information identifying the specific switches, ports, buffers, protocols, address information of received/transmitted packets and the like within the network elements that support the various traffic flows.

Configuration information comprises information identifying a network element, the function and/or configuration of the network element, the function and/or configuration of the sub-elements forming a network element and so on. Configuration information illustratively includes, but is not limited to, information identifying the type of network element, protocols supported by the network element, services supported by the network element and so on. Configuration information illustratively includes information attending to the various sub-elements within the network element, such as the input ports, switches, buffers, and output ports and so on associated with the sub-elements forming a network element.

Status/operating information comprises status/operating information associated with the operating state of the network element and/or the sub-elements forming a network element. Status/operating information illustratively includes, but is not limited to, information providing operating status/alarm indicators, including information pertaining to metrics such as packet count, utilization level, component pass/fail indication, bit error rate (BER) and the like.

Connection information comprises information useful in ascertaining or inferring the connections between network elements and/or sub-elements, such as the source of data received from the network element or its sub-elements, the destination of data transmitted by the network element or its sub-elements and so on. That is, connection information is information provided by a network element from the subjective perspective of the network element. The network element does not necessarily have information specifically identifying the network elements from which it receives packets or the network element toward which it transmits packets.

Connection information illustratively includes, but is not limited to, source address information associated with received packets, destination address information associated with transmitted packets, protocol information associated with packet flows, service information associated with packet flows, deep packet inspection results data and the like.

At a third discovery level, the network management system uses the discovered information to form a detailed framework representing each of the elements, sub-elements and links forming the infrastructure of the network, as well as their respective and various interconnections.

Generally speaking, the DE 221 may discover any suitable information associated with LTE network 110, which may be referred to collectively herein as discovery information, and further divided into configuration information, status/operating information and connection information.

In one embodiment, for example, DE 221 discovers components of the LTE network 110 and information associated with components of the LTE network 110. The components of LTE network 110 that are discovered by DE 221 may include any components, such as network elements (EPC network elements, non-EPC network elements, and the like), sub-elements of network elements (e.g., chassis, traffic cards, control cards, interfaces, ports, processors, memory, and the like), communication links connecting network elements, interfaces/sessions that support communications between network elements (e.g., LTE-Uu sessions, S* sessions, and the like), reference points, functions, services, and the like, as well as combinations thereof.

For example, DE 221 may discover the network elements of LTE network 110 (e.g., EPC network elements such as the eNodeBs 111, SGWs 112, PGW 113, MMEs 114, PCRF 115, and the like; non-EPC network elements that facilitate communication via sessions between the EPC network elements; and the like, as well as combinations thereof).

For example, DE 221 may discover network element configuration information associated with network elements of LTE network 110 (e.g., chassis configurations, line cards, ports on the line cards, processors, memory, and the like, which may depend on the types of network elements for which discovery is performed).

For example, DE 221 may discover interface/session information (e.g., information associated with LTE-Uu sessions, information associated with S* sessions, and the like, as well as combinations thereof). For example, DE 221 may discover reference points of LTE network 110 (e.g., the LTE-Uu, S1-u, S1-MME, X2, and other reference points associated with eNodeBs; the S1-u, S5/S8, S11, S4, and other reference points associated with SGWs; the S5/S8, SGi, SGx, S7, S2a, S2b, S2c, and other reference points associated with PGWs; the S1-MME, S11, S10, and other reference points associated with MMEs, the S7 and other reference points associated with PCRFs; and the like).

For example, DE 221 may discover functions, services, and the like, as well as combinations thereof. For example, DE 221 may discover information related to connectivity between network elements of LTE 110, which may include physical connectivity information and logical connectivity information (e.g., identification of communication links deployed within LTE network 110, identification of wavelengths being transported over particular fibers within LTE network 110, and the like, as well as combinations thereof).

The DE 221 may discover any other information that is associated with LTE network 110 and which is or may be suitable for use in providing the various management functions depicted and described herein (e.g., for use by CE 223 in determining paths of LTE network 110, for use by ANT 225 in performing analysis for LTE network 110, for use by AUT 226 in performing audits within LTE network 110, for use by TT 227 in performing mobile session path traces for mobile sessions within LTE network 110, for use by FMT 228 for providing enforcement functions within LTE network 110, and the like, as well as combinations thereof).

The DE 221 may discover the information associated with LTE network 110 in any suitable manner (e.g., from any suitable sources, at any suitable times, using any suitable protocols, in any suitable formats, and the like, as well as combinations thereof).

In one embodiment, for example, DE 221 may receive discovery information associated with LTE network 110 from one or more management systems associated with LTE network 110 (e.g., from other management systems, such as network inventory systems, network provisioning systems, and the like), from one or more element management systems (EMSs) managing respective subsets of the network elements of LTE network 110, from the network elements of LTE network 110, and the like, as well as combinations thereof.

In one embodiment, for example, the DE 221 may receive discovery information upon initial boot-up of elements of LTE network 110, via periodic updates initiated by elements of LTE network 110, in response to periodic updates requested by DE 221, in response to on-demand requests initiated by DE 221, and the like, as well as combinations thereof. The periodic requests may be configured to be performed using at any suitable intervals.

On-demand requests to the DE 221 may be in initiated in response to any suitable trigger conditions (e.g., in response to manually requests initiated by a user via user workstation 210, in response to requests initiated by CE 223 for purposes of obtaining additional discovery information for use in performing correlation functions, in response to requests initiated by ANT 225 for purposes of obtaining additional discovery information for use in performing analysis functions, in response to requests initiated by AUT 226 for purposes of obtaining additional discovery information for use in performing audit functions, in response to requests initiated by AT 227 for purposes of obtaining additional discovery information for use in performing trace functions, in response to requests initiated by FMT 228 for purposes of obtaining additional discovery information for use in performing enforcement functions, and the like, as well as combinations thereof)

The DE 221 may receive the discovery information using any suitable management and/or communications protocols. In one embodiment, for example, the DE 221 may receive discovery information via one or more of Simple Network Management Protocol (SNMP) traps, Network Configuration Protocol (NETCONF) messages, Transaction Language 1 (TL1) messages, and the like, as well as various combinations thereof.

The discovered information is stored in one or more databases to facilitate rapid retrieval by network operations personnel and/or other users, such as the Discovery Database (DD) 222. The DD 222 may store the discovery information in any suitable format, as will be understood by one skilled it the art. The DD 222 provides a repository of discovery information for use by CE 223 and, optionally, for use by one or more of ANT 225, AUT 226, TT 227, and FMT 228 for providing their respective management functions.

Correlation Engine Tool/Function

The CE 223 provides correlation of information used to support the management functions depicted and described herein. The CE 223 utilizes configuration information, status/operations information and/or connections information, illustratively provided by the DE 221 and stored within the DD 222, to correlate discovered network element, sub-element and link functions to specific customer traffic flows and/or paths supporting customer services. That is, using the framework representing each of the elements, sub-elements and links within the network and their various interconnections, the CE 223 correlates each customer service, traffic flow and/or EPS-path to the specific elements, sub-elements and links necessary to support the customer service, traffic flow and/or path.

The correlation process may be dynamic in that, for any given path, the underlying elements, sub-elements and links supporting that path may change over time due to local network adaptations, rerouting, failures, degradations, scheduled maintenance and the like. Thus, CE 223 may be invoked after a network change is detected or caused by any of the ANT 225, AUT 226, TT 227, and FMT 228.

The CE operates to maintain a current representation of the necessary supporting infrastructure associated with each customer service, traffic flow and/or path. By providing this representation, efforts responsive to customer service failure or degradation can be focused on the specific element, sub-element and link functions supporting the impacted customer service (e.g., by using TT 227). Similarly, efforts responsive to element, sub-element and link function failure or degradation can be focused on the specific customers and/or services supported by the impacted element, sub-element and link function.

Typically, only a small subset of the sub-elements within a particular element is necessary to support a particular path. Thus, a failure associated with other sub-elements within an element does not impact that particular path. By correlating to each path only those elements necessary to support the path, the processing/storage burdens associated with managing individual paths are reduced by avoiding processing/storage requirements associated with nonessential (from the perspective of a particular path) elements.

In one embodiment, CE 223 may process discovery information stored in DD 222 for purposes of determining the underlying transport elements supporting the paths of LTE network 110, which is then stored in PD 224. In one embodiment, the path correlated transport element information determined by CE 223 and stored in PD 224 include EPS-related paths of LTE network 110. In general, an EPS-related path is a path that is a transport mechanism that represents a peering relationship between two EPS reference points, where an EPS reference point is a termination point for any node of LTE network 110 that implements one or more of the protocols present in the 4G specification (e.g., using GTP, PMIP, or any other suitable protocols, and the like, as well as combinations thereof). The path correlated transport element information may comprise network elements, communications links, subnets, protocols, services, applications, layers and any portions thereof. These transport elements may be managed by the network management system or portions thereof. The network management system may simply be aware of these transport elements.

As depicted and described herein, EPS reference points may include: for an eNodeB (S1-u, S1-MME, X2, and the like); for an SGW 112 (S1-u, S5/S8, S11, Gxs, and the like); for a PGW (S5/S8, SGi, SGx, S7, S2a, S2b, S2c, and the like); for an MME (S1-MME, S11, S10, and the like); and for a PCRF (S7). Thus, EPS-related paths correspond generally to the various S* sessions between the eNodeBs and EPC nodes (e.g., a path between an eNodeB 111 and an SGW 112 in the case of S1-u reference points, a path between an SGW 112 and PGW 113 in the case of S5/S8 reference points, a path between an eNodeB 111 and an MME 114 in the case of S1-MME reference points, and the like).

In one embodiment, the path correlated transport element information determined by CE 223 and stored in PD 224 include other types of paths (e.g., paths other than EPS-related paths). For example, the other types of paths may includes one or more of: (1) paths that form sub-portions of EPS-related paths (e.g., where an EPS-related path is supported using underlying communications technology, the path that forms a sub-portion of the EPS-related path may be a path associated with the underlying communications technology, (2) paths that include multiple EPS-related paths (e.g., paths from eNodeBs to PGWs that traverse both S1-u and S5/S8 sessions, paths from UEs to SGWs that traverse both LTE-Uu sessions and S1-u sessions, and the like), and (3) end-to-end mobile session paths (e.g., paths between UEs and IP networks). The path correlated transport element information determined by CE 223 and stored in PD 224 may include other information correlated with various types of paths.

The path correlated transport element information determined by the CE 223 and stored in the PD 224 may be determined using any suitable processing.

The CE 223 is adapted for making direct correlations between discovered components of LTE network 110. For example, CE 223 may determine from the discovery information that a particular port on an eNodeB is connected to a particular port on a service router used to provide backhaul between the eNodeB and its SGW. For example, CE 223 may determine from the discovery information that a particular S1-u reference point on an eNodeB 111 is coupled to a particular S1-u reference point on an SGW 112. For example, CE 223 may determine from the discovery information that, for a given SGW 112, a particular S1-u interface on the eNodeB facing side of the SGW 112 maps to a particular S5/S8 reference point on the PGW facing side of the SGW 112. It will be appreciated that the foregoing examples are just a few of the many possible correlations which may be made by CE 223. The CE 223 is adapted for making any correlations between discovered components of LTE network 110 that enable CE 223 to determine a comprehensive view of the entire LTE network at all layers (e.g., from the physical layer all the way through the application layer and everything in between).

The CE 223 is adapted for making inferences regarding associations between discovered components of LTE network 110. For example, CE 223 may have information indicating that certain data is being transmitted from a certain port on an eNodeB via a S1-u interface of the eNodeB and may have information indicating that certain data is being received at a certain port on an SGW via an S1-u interface of the SGW, and may use this information about the data in order to infer that the port of the eNodeB and the port of the SGW are logically connected for communicating via the S1-u interface. For example, CE 223 may have information indicating that the interface on an eNodeB is directly connected to the SGW through a physical Link, through a routed network, or through a VPN service (L2, L3).

In one embodiment, the network manager within which the CE 223 is operative includes substantially all of the information related to the peering of different EPS Paths (including S1-u). From that peering information, the CE 223 may identify nodes on each end of a path and then identify or examine the corresponding neighbor nodes. From the neighbor node information, the CE 223 may then identify or examine a next group of neighbor nodes and so on.

This process of identifying or examining in sequence each subsequent group of neighbor nodes advantageously uses the incrementally gained neighborhood node information to reduce (or filter) candidate neighbors to form thereby a smaller list. This process, especially when used in conjunction with a topology Discovery Profile (template) selected by the operator, reduces the complexity and processing resource allocation associated with the correlation process.

A topology Discovery Profile or template is an association of a path with a "hint" or other guidance indicative of a type of path, Mobile Service, segments forming the path or Mobile Service, types of nodes at the endpoint of the segments and so on. For example, a particular network operator may typically architect paths according to one of two or three standard techniques. In this case, the operator may provide a hint about the architecture pertaining to a path of interest.

A topology Discovery Profile or template is especially useful within the context of a trying to manage a cloud or unmanageable portion of a network, such as a portion of a network leased from a third party network provider. For example, to fill out service gaps within a network, a network operator may lease network services from a third party. Unfortunately, while the third party is obligated to provide the leased services according to a service-level agreement, the third party typically does not provide any ability for the network operator leasing the services to manage infrastructure within the third party network supporting the leased network services.

In one embodiment, the third party network operator providing the leased services provides hints or a profile/template indicative of the likely topology or infrastructure used to support the leased services. That is, the network operator provides services according to one or more of a finite number of topology options or infrastructure options. The network operator may provide this information to the lessee such that the service aware manager of the lessee may more clearly understand the particular infrastructure elements supporting the paths through the leased portion of its network.

For example, a network operator may indicate or "hint" that a particular S1-u corresponds to a particular Discovery Profile or template number, where each number represents a particular topology or infrastructure. For example, a first hint or template may provide that connections between an eNodeB and a SGW are provided by a specific number of segments or links, where each segment or link corresponds to a respective segment or link type, and where each of the segments or links interconnects eNodeBs, switches, routers and other network elements in a particular manner. For example, an operator hint or profile may indicate that a first segment is a pure routing segment, a second segment is a physical Link (e.g., LLDP will automatically provide a peer), a third segment is an E-Pipe (P2P L2VPN) and so on. Other hints or templates may provide different topologies, connections arrangements and the like.

The correlation engine begins processing a path upon discovering that path from a managed network element. The correlation engine calculates, infers and/or otherwise discovers the various infrastructure elements, sub-elements and links supporting that path upon discovery of the path.

In one embodiment, an initial S1-u reference point in the SGW is discovered. When any reference points or S-peers are discovered, a corresponding S-path is then formed.

In various embodiments, a service aware manager provides discovery and/or correlation of the entire network at once, by section or region, or by individual nodes or network elements. In this manner, EPS peers can be discovered (or resynchronized) throughout the operational life of the service aware manager. For example, EPS peers may be created in accordance with a discovery or with an event (e.g., an SNMP Trap or other event) indicating that a new EPS Peer has been created on a NE. This may happen, illustratively, when an operator is installing a new eNodeB in the network and the newly installed eNodeB becomes the peer of an existing (and already managed) SGW.

It will be appreciated that the foregoing examples are just a few of the many possible inferences which may be made by CE 223. The CE 223 is adapted for making any inferences related to correlation of discovered components of LTE network 110 that enable CE 223 to determine a comprehensive view of the entire LTE network at all layers (e.g., from the physical layer all the way through the application layer and everything in between).

The paths determined by the CE 223 may have any suitable path information associated therewith. In one embodiment, for example, path information associated with an EPS-related path may include any information indicative of the underlying communications capabilities supporting the EPS-related path. For example, the path information for an EPS-related path may include information identifying S* reference points forming the endpoints of the EPS-related path, identifying network elements supporting the path (e.g., routers, switches, and the like), identifying ports on the network elements that support the path, identifying IP interfaces supporting the path, specifying configurations of the IP interfaces supporting the path, specifying the configurations of the ports of network elements that support the path (e.g., administrative configurations, operational configurations, and the like), and the like, as well as combinations thereof.

For example, the path information for an EPS-related path may include other information that is associated with the portions of the underlying communication network supporting the EPS-related path, e.g., identification of communication links between network elements, identification of logical paths on the communication links (e.g., such as specific MPLS paths supporting the EPS-related path, specific wavelengths in optical fibers supporting the EPS-related path, and the like), and the like, as well as combinations thereof. In one embodiment, for example, path information associated with other types of paths may include some or all of the path information described with respect to EPC paths, other types of path information (which may depend on the other types of paths), and the like, as well as combinations thereof. In such embodiments, the path information associated with a path may include any other suitable information, which may vary for different types of paths, for different paths of the same type, and the like.

In one embodiment, CE 223 may support additional processing in order to support management functions provided by one or more of the tools (i.e., ANT 225, AUT 226, TT, 227, and FMT 228). In one embodiment, CE 223 may process discovery information stored in DD 222 and/or path correlated transport element information stored in PD 224 in order to support management functions provided by one or more of ANT 225 (e.g., for providing analysis functions), AUT 226 (e.g., for providing audit functions), TT 227 (e.g., for providing trace functions), and FMT 228 (e.g., for providing enforcement functions). In one embodiment, CE 223 may process management function information generated by one or more of the tools in support of management functions provided by one or more of the tools (e.g., where CE 223 processes information on behalf of one or more of the tools for use by that tool or for use by one or more of the other tools in providing management functions). The CE 223 may provide any other correlation functions suitable for providing and/or supporting the various management functions depicted and described herein.

In various embodiments, paths are grouped together in a logical structure according to a common element, sub-element, link, service, provider, third party service lessee and so on.

A bundle may be a logical grouping of paths that share a common element, such as a common end point element, start point element and the like. In this context, bundling is useful to identifying all of the paths that will be impacted by the failure of the common element. That is, a number of paths terminated at a particular network element from a plurality of other network elements of a common type may be defined as a bundle or group. Examples include "all of the eNodeB elements in communication with SGWx" where SGWx represents a specific SGW); or "all of the SGWs communicating with a PGWx" (where PGWx represents a specific PGW). These and other bundles or groups may be defined to enable rapid identification of network elements or sub-elements that are similarly situated in terms of a common network element or sub element to which they are connected.

A bundle may be generalized as a logical grouping of paths that share any common structure or entity, such as a group of paths associated with a common billing entity, a specific network provider, a specific service offering and the like. In this context, bundling is useful, in identifying the specific infrastructure (and its usage) associated with a billing entity, network provider, service offering and the like. This is especially useful within the context of leasing network resources to a third party under a service level agreement where it is necessary to both monitor usage and support the services purchased by the third party. Examples include "all the mobile services that are anchored in an eNodeB that services a specific Access Point Name (APN) (such as a telecommunications or cable company); or "all of the SGWs or PGWs that service a particular service provider." In a service provider example, a third party service provider may lease space at one or more eNodeBs to provide service to its mobile users (e.g., via specific reserved frequencies on each of a plurality of eNodeBs).

The correlated information is stored in one or more databases to facilitate rapid retrieval by network operations personnel and/or other users, such as the Path Database (PD) 224. The PD 224 stores path correlated transport element information determined by CE 223. The PD 224 may store the path correlated transport element information and associated path information in any suitable format. The PD 224 provides a repository of path and network element related information for use by one or more of ANT 225, AUT 226, TT 227, and FMT 228 for providing their respective management functions.

Figure 3:
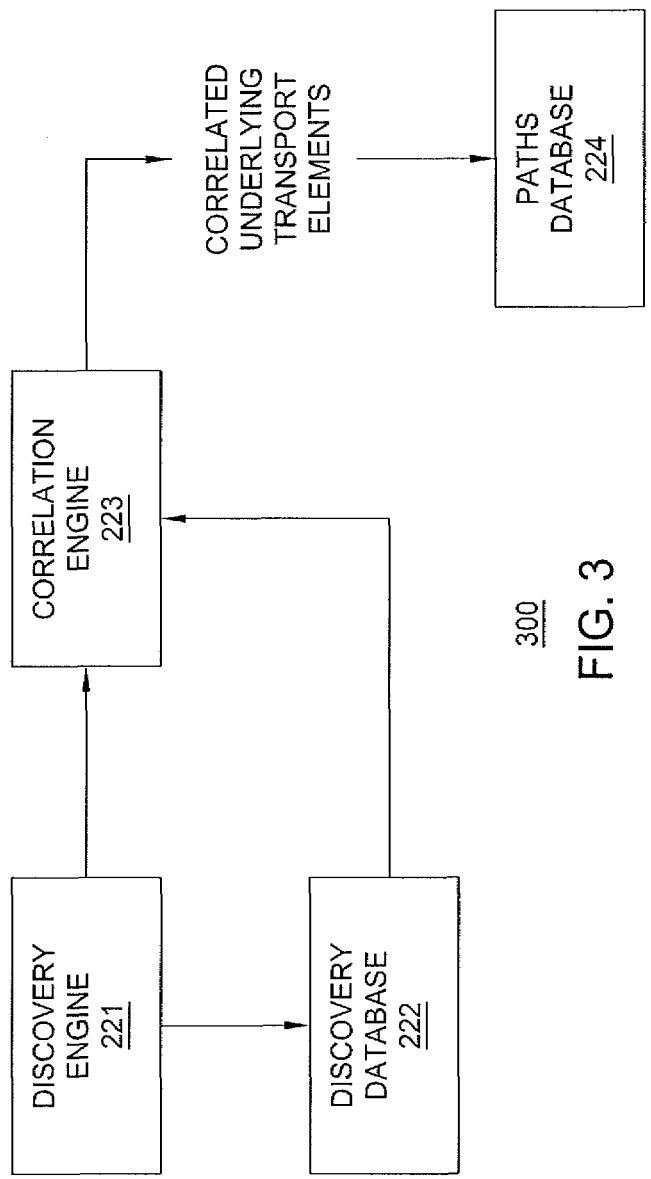
FIG. 3 depicts a high-level block diagram illustrating a discovery and correlation process performed by the exemplary management system of FIG. 2.

FIG. 3 depicts a high-level block diagram illustrating a discovery and correlation process performed by the exemplary management system of FIG. 2. As depicted in FIG. 3, and described herein with respect to FIG. 2, the discovery and correlation process 300 performed by exemplary MS 140 is performed by DE 221, DD 222, CE 223, and PD 224. The DE 221 discovers information associated with LTE network 110 and stores discovery information in DD 222, DE 221 and DD 222 provide discovery information to CE 223 for use by CE 223 in correlating the discovery information for identifying paths of the LTE network and storing the path correlated transport element information associated with the identified paths of the LTE network in the PD 224. The discovery and correlation process 300 of FIG. 3 may be better understood by way of reference to FIG. 2.

As depicted in FIG. 2, ANT 225, AUT 226, TT 227, and FMT 228 each provide various management functions for LTE network 110.

The ANT 225 structures EPS elements of an LTE network into Mobile Services. In one embodiment, the EPS elements include the EPS network elements (e.g., eNodeBs, SGWs, PGWs, MMEs, the PCRF, and/or any other EPS-related network elements) and the EPS-related interconnectivity between the EPS network elements (e.g., S* sessions, G* sessions, and the like). For example, with respect to LTE network 110 of FIG. 1, the ANT 225 structures EPS elements of the LTE network 110 into Mobile Services (e.g., eNodeBs 111, SGWs 112, PGW 113, MMEs 114, PCRF 115, S* sessions, and the like). In this manner, a Mobile Service is a representation of EPS network elements and EPS-related interconnectivity between the EPS network elements.

The Mobile Service stores for each network element a list of all of the other network elements connected to it. Thus, for a particular eNodeB, the Mobile Service stores a list including the SGW and PGW to which the eNodeB communicates. Similarly, for a particular SGW, the mobile service stores a list including the eNodeBs and PGW to which the SGW communicates. Other common or anchor elements may be used to form such bundles. These examples contemplate, respectively, a particular eNodeB as an anchor or common element and a particular SGW as an anchor or common element. Other anchors or common elements may be defined within the context of the various embodiments.

The ANT 225 may structure EPS elements of LTE network 110 into Mobile Services using any suitable information (e.g., using the underlying transport elements correlated to EPS-related paths from PD 224, by processing discovery information from DD 222, and the like, as well as combinations thereof). In one embodiment, ANT 225 is configured to automatically create Mobile Services as areas of the LTE network 110 are discovered by DE 221.

Analyzer Function/Tool.

Figure 4:
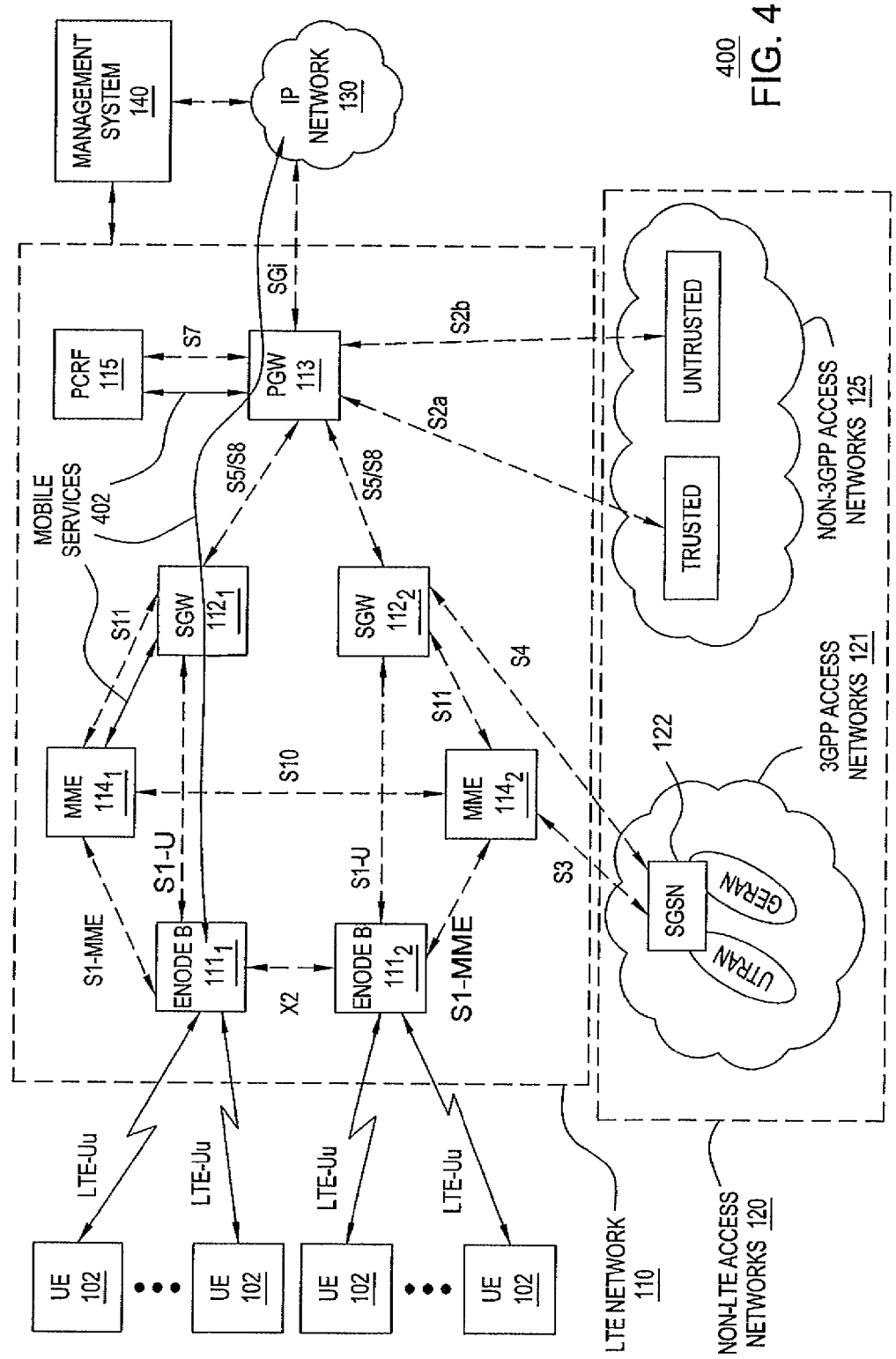
FIG. 4 depicts an exemplary Mobile Service supported by the LTE network of FIG. 1.

FIG. 4 depicts an exemplary Mobile Service supported by the LTE network of FIG. 1. Specifically, FIG. 4 depicts an exemplary communication system 400 that is substantially identical to exemplary communication system 100 of FIG. 1, except that FIG. 4 further depicts a path associated with a Mobile Service 402.

As depicted in FIG. 4, the exemplary Mobile Service 402 includes eNodeB $111_1$, SGW $112_1$, PGW 113, the S1-u interface between eNodeB $111_1$ and SGW $112_1$, the S5/S8 interface between SGW $112_1$ and PGW 113, the SGi interface between PGW 113 and IP networks 130, the S1-MME interface between eNodeB $111_1$ and MME $114_1$, the 51-u interface between SGW $112_1$ and MME $114_1$, and the S7 interface between PGW 113 and PCRF 115. The exemplary Mobile Service 402 is marked on FIG. 4 using a solid line representation. Optional embodiments may include MME $114_1$ and PCRF 115, for example.

The ANT 225 enables the service provider of an LTE network to have a current view of the status of the service delivery distribution network from the IP Core network through the eNodeB access nodes at the edge of the LTE network. The ANT 225 enables the service provider of an LTE network to monitor the status of the LTE network at a logical level. This is advantageous for efficiently diagnosing problems or potential problems which may impede delivery of mobile traffic within the LTE network. For example, equipment of the LTE network may be operational, but misconfiguration on an SGW instance might be blocking delivery of mobile traffic.

The ANT 225 enables the service provider of an LTE network to quickly and easily identify which components of the LTE network 110 are responsible for problems or potential problems identified at the Mobile Service level of LTE network 110, e.g., by identifying which EPS element(s) are responsible for the problem or potential problem, and then further identifying which component(s) of the responsible EPS element(s) are responsible for the problem or potential problem.

For example, this may include identifying, at the Mobile Service level, a specific EPS network element that is responsible for the problem, and then drilling down on the EPS network element that is responsible for the problem to identify components of the EPS network element that are responsible for the problem. The components of EPS network elements may include any components of the EPS network elements (e.g., traffic cards, control cards, ports, interfaces, processors, memory, and the like).

For example, this may include identifying, at the Mobile Service level, a specific EPS interconnection (e.g., S* sessions, G* sessions, and the like) that is responsible for the problem, and then drilling down on the EPS interconnection that is responsible for the problem to identify components of the EPS interconnection that are responsible for the problem. The components of EPS interconnections may include any components. It will be appreciated that the EPS interconnections described with respect to ANT 225 correspond to the EPS-related paths described with respect to CE 223 and correlated to underlying transport elements such as provided via PD 224. Thus, the components of EPS interconnections may include components associated with EPS-related paths as discussed with respect to the CE 223 and PD 224 (i.e., the transport elements and components that provide the underlying communications capability for the EPS-related paths).

For example, the components of EPS-related paths may include S* reference points forming the endpoints of the EPS-related paths, network elements (e.g., routers, switches, and the like), components of network elements (e.g., line cards, ports, interface, and the like), communication links between network elements, logical paths on communication links between network elements (e.g., such as specific MPLS paths supporting the EPS-related path, specific wavelengths in optical fibers supporting the EPS-related path, and the like), and the like, as well as combinations thereof.

The ANT 225 may drill down on EPS elements in any suitable manner, which may depend on the type of EPS element for which component information is desired (e.g., using discovery information stored in DD 222 for determining components of EPS network elements, using the path correlated transport elements, sub-elements, systems and other information stored in PD 224 for determining components of EPS-related paths, and the like, as well as combinations thereof).

The ANT 225 may perform one or more management functions for Mobile Services determined by ANT 225.

In one embodiment, ANT 225 may collect statistics associated with Mobile Services (e.g., end-to-end statistics associated with the Mobile Service, statistics associated with individual components and/or subsets of components of the Mobile Service, and the like, as well as combinations thereof). The ANT 225 may analyze collected statistics for identifying the presence of congestion, or impending presence of congestion, associated with Mobile Services. The ANT 225 may proactively determine, on the basis of such analysis, solutions for resolving or preventing congestion.

In one embodiment, ANT 225 may initiate audits for verifying Mobile Services (e.g., for ensuring that the view of Mobile Services currently maintained by ANT 225 is accurate and does not need to be updated, for use in updating the view of Mobile Services where such updating is required, and the like, as well as combinations thereof). The ANT 225 may analyze the results of such audits for determining the manner in which the LTE network has been built (or discovered) in order to find topological and/or configuration errors within the LTE network and, further, for suggesting associated improvements.

In one embodiment, ANT 225 may initiate Operations, Administration, and Maintenance (OAM) tests for Mobile Services. In this embodiment, the OAM tests may be initiated in any suitable manner. For example, OAM tests may be initiated manually, automatically in response to any suitable trigger conditions (e.g., per a fixed schedule, in response to detecting an indication of a fault associated with a component which may form part of the Mobile Service, and the like), and the like, as well as combinations thereof). For example, OAM tests may be generated for a specific Mobile Service and then scheduled at different times of the day to monitor the status of the Mobile Service. The ANT 225 may be configured to use the results of such OAM tests to identify areas of high contention within the LTE network 110.

The ANT 225 may perform fault analysis for Mobile Services. In one embodiment, for example, in response to detecting an event on one of the sub-components of a Mobile Service(s), ANT 225 may determine the effect of the event on the Mobile Service(s). The ANT 225 may identify any events which may be associated with components of Mobile Services (e.g., EPS network elements, EPS interface, and the like). The ANT 225 may identify events in any suitable manner using messages associated with any suitable management protocol(s), such as SNMP traps, TL1 messages, and the like. The ANT 225 may categorize detected events based on their importance. The importance may be determined based on any suitable parameter or parameters (e.g., the location of the event, the type of event, and the like, as well as combinations thereof). For example, an event associated with an eNodeB may be deemed to be less important than an event associated with a PGW, since PGWs support a much larger number of users than eNodeBs.

The ANT 225 may initiate generation of imagery adapted for being displayed to provide network technicians of the service provider with a visual representation of the event (e.g., location of the event, scope of the event, and the like).

The ANT 225 also may initiate one or more OAM tests (e.g., ping, traceroute, and the like) for the Mobile Service(s) associated with the event, in order to determine additional information providing a better understanding of the scope and impact of the event. The ANT 225 may initiate such OAM tests manually and/or automatically (e.g., as part of error detection, as part of a scheduled initiation of OAM tests, and the like, as well as combinations thereof).

The ANT 225 may perform any other suitable management functions associated with Mobile Services determined by ANT 225.

Generally speaking, the analyzer tool may be invoked after the network manager discovers the network elements and their connections as previously described. The service aware manager identifies the LTE type network elements, such as PGW, SGW, eNodeB, MME, PCRF, SGSN and the like. Of primary interest are the PGW, SGW and eNodeB. Between these network elements are EPS paths having associated reference points on the network elements, where the EPS paths/reference points are denoted as S1-u, S5, SGi and so on. Thus, stored in a database is a collection of modular components, of type "network element" for the PGW, SGW, eNodeB and the like, or type "connector" for the EPS paths.

After discovering the network elements and connectors, the service aware manager defines a plurality of Mobile Services by connecting or concatenating instances of the two types of modular components (i.e., network elements and connectors), such as the sequence of network elements and connectors between a customer served via a specific eNodeB and a data stream or other service received from the IP core network at the PGW. Thus, in one embodiment, a mobile service comprises a structure or wrapper containing a concatenated sequence of network elements and connectors. A Mobile Service may be defined in terms of a particular customer, a particular eNodeB, a particular APN and so on. A mobile service may include one or more instances of an EPS on a network element, such as one or more of an SGW or a PGW on a single or common network element.

After defining the Mobile Services, the Mobile Services may be analyzed or tested. Such testing may be directed to the components forming a Mobile Service, the endpoints associated with the Mobile Service and the like. Such testing may be directed to specific portions of specific components or endpoint forming the Mobile Service.

In one embodiment, individual Mobile Services or groups of Mobile Services are analyzed by collecting statistics from each of the Mobile Service modular components forming the particular individual or groups of Mobile Services. That is, a Mobile Service analysis request (generated manually or automatically) is interpreted by the management system as a request to gather statistical information pertaining to each of the modular components (e.g., network elements and connectors) forming a Mobile Service.

For example, assume that a Mobile Service comprises a plurality of network elements and connectors arranged in the following sequence: "eNodeB, S1-u, SGW, S5, PGW". In response to an analysis request of the Mobile Service, the analysis tool gathers statistical values associated with each of the components forming the Mobile Service (i.e., the elements and connectors) to provide thereby data describing, illustratively, the operational status of the Mobile Service, the components forming a Mobile Service, the endpoints of the Mobile Service and/or other information pertaining to the Mobile Service.

In one embodiment, OAM tests such as ping tests (e.g., ICMP ping test), trace route tests and the like may be run upon the Mobile Service to ensure that the components forming a Mobile Service are operational and not degraded, that connectivity between the various components exists, that the test results conform to expected test results such as based upon a rolling average or other historical/statistical representation of prior test results. In this manner, an OAM test ensures that Mobile Services are operational and, further, obtains statistical information useful in predicting degradations or failures of one or components forming the Mobile Service. For example, an OAM test may comprise the execution of specific Mobile Service tests every 15 minutes, two hours or other predetermined time period.

All tests performed on the Mobile Service or Mobile Service portions will return some result. The result should fall within an acceptable or expected results range. Results returned outside of this range (or not returned at all) are likely indicative of an immediate or existing problem with the Mobile Service components, subcomponents or endpoints. For example, a ping test indicating a 1 second delay time between a PGW and an eNodeB may be indicative of a problem in a Mobile Service between these two endpoints. By sequentially "pinging" each of the network elements in the connection, components forming a Mobile Service proximate the location of the problem may be found quickly (e.g., the component after which the return result changes from a normal low delay value to the 1 second delay time).

Changes in the returned result of one or more tests over time may also be indicative of a problem that exists or a problem that will exist in the future. By tracking the results of these tests over time, and correlating the test results to degradations and/or failures over time, operating characteristics associated with impending degradations and/or failures may be predicted.

In one embodiment, the analysis tool automatically instantiates tests or suites of tests in response to specific operating characteristics of the network, manual requests for test suites, automatic requests for test suites and the like. A test suite comprises a plurality of predefined tests to be performed upon one or more Mobile Services either once or periodically in which specific test results ranges are expected. Test suites log the various parameters associated with the tests, the network element and connection components tested, and any ancillary data that is desired (e.g., other network operating characteristics such as bandwidth utilization, bit error rate and the like that are useful in correlating test result data changes over time to specific problems).

The tests or suites of tests are invoked depending upon the severity of alarm, the importance of the network component raising the alarm, the type of alarm and so on. As an example, an alarm raised by an eNodeB to its Mobile Service is less important than a similar alarm raised by a PGW. Alarm triggers may be used in various embodiments to invoke tests or suites of tests. Generally speaking, a trigger condition may be associated with a starting point parameter (e.g., an initial network element or communication link associated with the trigger condition) and/or a task parameter (e.g., one or more tasks forming at least a portion of an appropriate response to the trigger condition).

Thus, the logical representation of modular components such as "network element" and "connector" to form Mobile Services enables precise auditing, analysis and tracing functions to be implemented within the context of the various embodiments.

Figure 5:
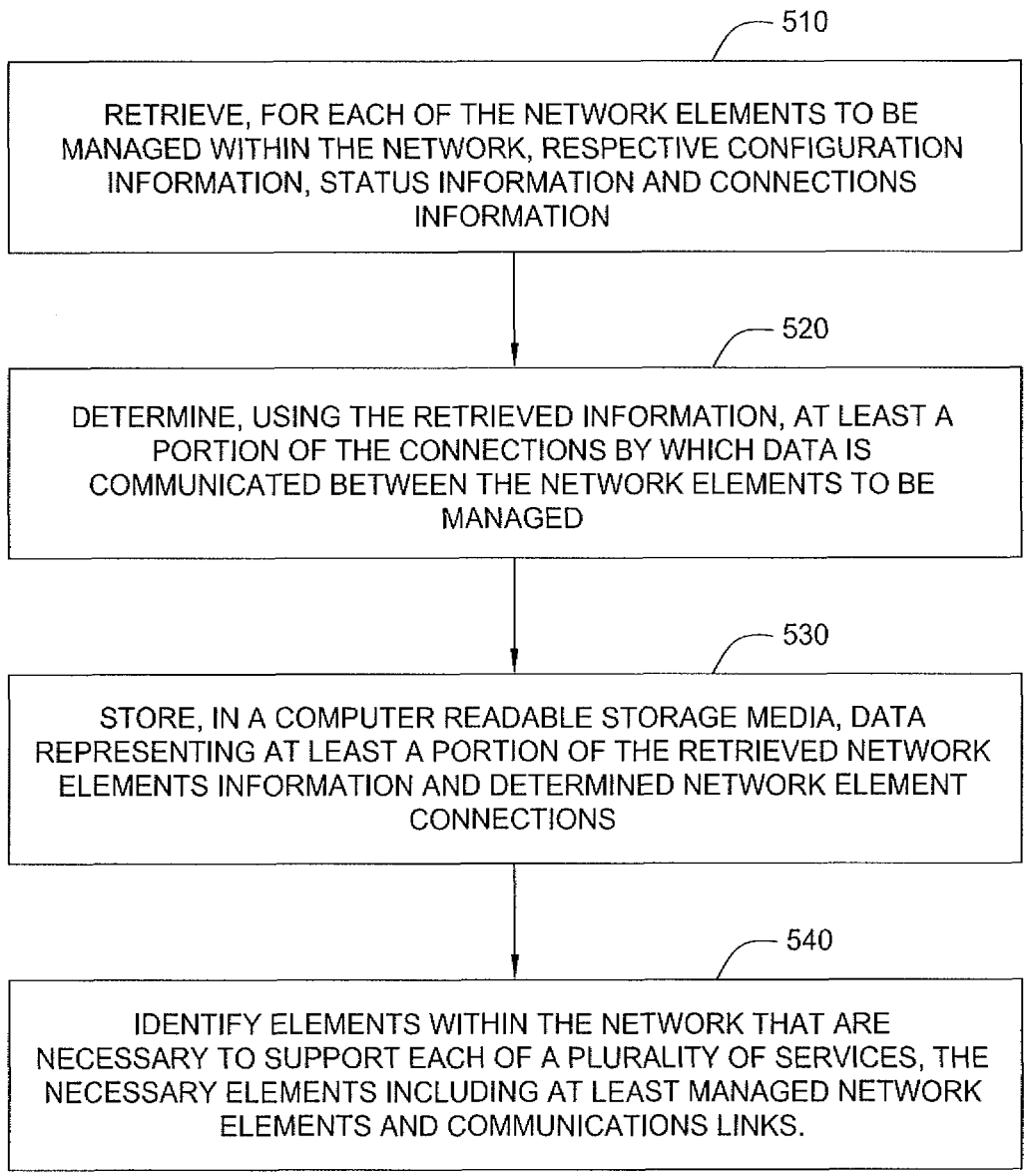
FIG. 5 depicts one embodiment of a method for performing an analysis function.

FIG. 5 depicts one embodiment of a method for performing an analysis function. Specifically, FIG. 5 depicts a flow diagram of a method 500 adapted for use in managing a network comprising a plurality of network elements.

At step 510, the method retrieves, for each of the network elements to be managed within the network, respective configuration information, status information and connections information.

At step 520, using the retrieved information, the connections or links by which data is communicated between a portion of or all of the network elements are determined.

At step 530, data representing at least a portion of the determined network element connections of the retrieved network element information is stored in a computer readable storage medium, such as a database or other memory element.

At step 540, the elements within the network that are necessary to support each of a plurality of services are identified, the identified network elements including this determination including at least managed network elements and communications links.

Although primarily described with respect to embodiments in which such management functions are performed by ANT 225, it will be appreciated that any of these management functions may be performed by one or more of other engines and/or tools of MS 140, one or more other management systems in communication with MS 140 (omitted for purposes of clarity), and the like, as well as combinations thereof.

Auditor Function/Tool.

The AUT 226 provides an audit capability for auditing LTE network 110. The AUT 226 enables proactive auditing of network infrastructure of LTE network 110 for identifying and handling network faults or potential network faults that are impeding or may impede end user traffic. Various embodiments of the AUT 226 are described in more detail in co-pending U.S. patent application Ser. No. 12/696,425, filed Jan. 29, 2010, entitled "Method and Apparatus for Auditing 4G Mobility Networks," which application is incorporated herein by reference in its entirety.

Briefly, the AUT 226 supports quick detection of network faults or potential network faults, impact analysis for determining the impact of faults or potential impact of potential network faults, and rectification of any network faults or potential network faults. The AUT 226 provides an ability to perform in-depth network health or sanity checks on LTE network 110 at any granularity level, e.g., for checking the health of ports, line cards, physical connectivity, logical connectivity, S* reference points, S* sessions, network paths, end-to-end mobile sessions of end users, and the like, as well as combinations thereof. The AUT 226 provides significant advantages in managing LTE networks, as such networks are inherently complex and, thus, highly susceptible to network faults that are often difficult to correlate to mobile subscriber data that has been packetized for transport over an IP network traversing multiple network elements that utilize different transport technologies and applied QoS policies.

In one embodiment, AUT 226 supports auditing of interconnectivity within LTE network 110. The auditing of interconnectivity may include proactively monitoring for connectivity, testing connectivity, and performing like auditing functions.

In one embodiment, auditing of interconnectivity within the LTE network 110 includes auditing interconnectivity between eNodeBs and EPC nodes of LTE network 110 (e.g., between eNodeBs 111, SGWs 112, PGW 113, MMEs 114, and PCRF 115, via the associated S* interfaces). In this embodiment, auditing of interconnectivity within the LTE network 110 includes auditing one or more EPS-related paths of LTE network 110.

The AUT 226 is capable of running tests on demand or on a schedule to determine whether the structure supporting the various paths is operating appropriately, such as within pre-define operational parameters indicative of appropriate operation (e.g., not over utilized, not too high a BER and so on).

In one embodiment, a preferred starting point for invoking the AUT 226 is the reference points terminated at the SGW (rather than at an eNodeB). It is known via the discovery/correlation processes that there are particular paths, connections or services between the SGW and the eNodeBs it serves. It is further known whether the paths, connections or services traverse other equipment, such as routers, switches and the like.

The AUT 226 may be used to test numerous parameters associated with the underlying infrastructure and or the path. Moreover, the testing may be performed in an incremental fashion from a first or initial reference point, where each subsequent infrastructure device within the path is subjected to testing from AUT 226. One simple test is to determine if the input ports and/or output ports associated with the infrastructure devices supporting the path are functioning or not functioning. This may be accomplished by sending query messages to each infrastructure device, by sending a test message or vector through the path and examining the test message or vector and each of a plurality of input/output ports.

In one embodiment, user guided processing by AUT 226 is provided. In this embodiment, user hints or other indicia of likely infrastructure topology is provided, such as where a third party/unknown/unmanaged portion of the network requires testing. In this context, a hint may comprise a suggestion or likely topology utilized by the third party within its portion of the network. As described herein, in general, an EPS-related path is a path that is a transport mechanism that represents a peering relationship between two EPS reference points, where an EPS reference point is a termination point for any node of LTE network 110 that implements one or more of the protocols present in the 4G specification (e.g., using GTP, PMIP, or any other suitable protocols, and the like, as well as combinations thereof). As depicted and described herein, EPS reference points may include: for an eNodeB (S1-u, S1-MME, X2, and the like); for an SGW 112 (S1-u, S5/S8, S11, Gxs, and the like); for a PGW (S5/S8, SGi, SGx, S7, S2a, S2b, S2c, and the like); for an MME (S1-MME, S11, S10, and the like); and for a PCRF (S7). Thus, EPS-related paths correspond generally to the various S* sessions between the eNodeBs and EPC nodes (e.g., a path between an eNodeB 111 and an SGW 112 in the case of S1-u reference points, a path between an SGW 112 and PGW 113 in the case of S5/S8 reference points, a path between an eNodeB 111 and an MME 114 in the case of S1-MME reference points, and the like).

As described herein, EPS-related paths of LTE network 110 may be supported using any suitable underlying communications technologies. For example, an S1-u path between an eNodeB 111 and SGW 112 may be supported using a full IP/MPLS network which may include routers, switches, communication links, protocols, and the like. For example, an S5/S8 path between an SGW 112 and a PGW 113 may be supported using an IP mesh backhaul network that includes edge routers, core routers, communication links, protocols, and the like. The S* paths each may be supported using any suitable underlying communication technologies. In this embodiment, the auditing may include correlating different interconnection technologies and transport layers which support the respective S* sessions between EPC nodes of LTE network 110.

Figure 6:
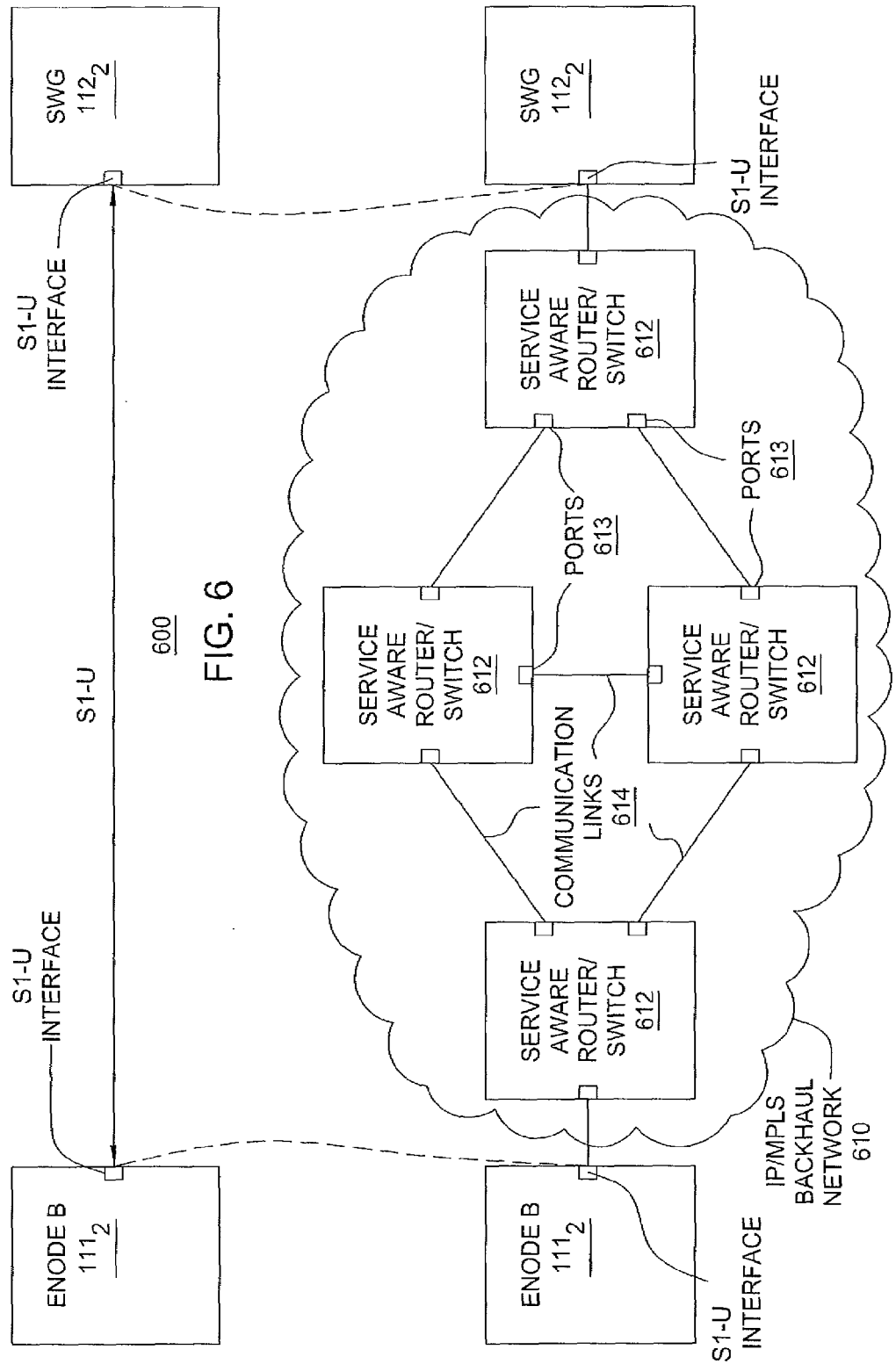
FIG. 6 depicts an exemplary EPS-related path of the LTE network of FIG. 1.

FIG. 6 depicts an exemplary EPS-related path of the LTE network of FIG. 1. As depicted in FIG. 6, the exemplary EPS-related path 600 is an S1-u path between an eNodeB and a SGW (illustratively, between eNodeB $111_2$ and SGW $112_2$). The exemplary EPS-related path 600 includes an S1-u interface $602_A$ on eNodeB $111_2$ and an S1-u interface $602_Z$ on SGW $112_2$. The exemplary EPS-related path 600 is supported using an IP/MPLS backhaul network 610, which is a mesh network including a plurality of service aware routers (SARs) and/or service aware switches (SASs) 612. The SARs/SASs 612 include ports 613, which typically have administrative and operational states associated therewith. The SARs/SASs 612 are interconnected via a plurality of communication links 614. It will be appreciated that exemplary EPS-related path 600 may be provided using any other communications technologies suitable for supporting paths between elements of LTE network 110.

The auditing of an EPS-related path may be performed in any suitable manner. In one embodiment, for example, auditing of an EPS-related path may include the steps of: (a) determining a current configuration of the path (e.g., performing processing of discovery information in DD 222 to determine the current configuration, requesting CE 223 to determine the current configuration, and the like, as well as combinations thereof), (b) obtaining the last known configuration of the path (e.g., from PD 224 information or any other suitable source of such information), (c) verifying the current configuration of the path against the last known configuration of the path, (d) if the current and last known configurations of the path match, initiating a test of the path at the LTE protocol level (e.g., initiating a GTP ping test, an MPIP ping test, or any other suitable test or tests depending on the protocol(s) being used to support the path), (e) if the protocol-level test of the path is successful, verifying the configuration of the IP interfaces, which may include verifying routing configuration, testing transport connectivity between the IP interfaces associated with the EPS reference points of the path at the IP level (e.g., using ICMP pings or other suitable testing capabilities), and the like, (f) if configuration of the IP interfaces is successful, verifying the administrative states of the ports, and (g) if the administrative states of the ports are verified successfully, verifying the operational states of the ports.

Tracer Function/Tool.

The TT 227 is configured to provide a mobile session trace capability. The mobile session trace capability enables a path of a mobile session of a UE to be traced through a wireless network. Various embodiments of the TT 227 are described in more detail in co-pending U.S. patent application Ser. No. 12/696,642, filed Jan. 29, 2010, entitled "Method and Apparatus for Tracing Mobile Sessions," which application is incorporated herein by reference in its entirety.

Briefly, the TT 227 enables a determination of the path of a mobile session through a wireless network and, optionally, determination of additional information associated with the mobile session. The mobile session trace capability enables wireless service providers to perform management functions based on the determined path of the mobile session through the wireless network.

The TT 227 is configured to determine the path of mobile sessions through LTE network 110. The TT 227 also may perform other functions associated with mobile sessions determined by TT 227, such as determining additional information associated with the mobile sessions, performing management functions for the mobile sessions, and the like, as well as combinations thereof.

The TT 227 may provide only the mobile session trace capability, or may provide the mobile session trace capability in addition to one or more other management functions. The TT 227 is configured to determine the path of a mobile session through a wireless network. The TT 227 also may be configured to perform additional functions for mobile sessions. For example, the TT 227 may be configured to determine additional information associated with mobile sessions, to correlate mobile session information to other information, to perform various management functions for mobile sessions (e.g., one or more of monitoring mobile sessions, diagnosing problems with mobile sessions, anticipating problems with mobile sessions, correcting problems with mobile sessions, and performing like management functions for mobile sessions), and the like. The TT 227 is optionally configured or adapted to perform various combinations of the functions described herein.

Although primarily depicted and described with respect to embodiments in which the functions of the mobile session trace capability are performed by TT 227, it will be appreciated that various functions of mobile session trace capability and/or in support of the mobile session trace capability may be performed by TT 227 in combination with one or more other engines and/or tools of MS 140, by one or more other engines and/or tools of MS 140 for providing information to TT 227 for use by TT 227 in providing various functions of the mobile session trace capability, and the like, as well as combinations thereof.

The TT 227 may be configured or adapted to perform broader management functions using information associated with mobile session path traces, such as diagnosing broader network problems, anticipating broader network problems, performing network optimization actions, and other management functions.

Fairness Manager Function/Tool.

The FMT 228 provides various fairness management mechanisms adapted to controlling usage of network resources by mobile subscribers. Various embodiments of the FMT 228 are described in more detail in co-pending U.S. patent application Ser. No. 12/696,520, filed Jan. 29, 2010, entitled "Method and Apparatus for Managing Mobile Resource Usage," which application is incorporated herein by reference in its entirety.

Briefly, the FMT 228 enforces appropriate resource (e.g., bandwidth) usage by customers, such as defined by service level agreements (SLAs) and the like. The fairness manager enforces appropriate bandwidth usage by any of a variety of enforcement mechanisms. The fairness manager is operative to enforce appropriate resource consumption levels associated with various users, groups of users, customers, third party network purchasers and the like, whether those levels are defined by agreement or acceptable practice.

The FMT 228 operates, in various embodiments, to identify one or more network elements experiencing congestion or likely to experience congestion in the near future.

In one embodiment, FMT 228 identifies congestion of a network element via detection of alarms (e.g., alarms associated with the network element, alarms associated with paths connected to the network element, and the like), via control messages received from one or more other modules (e.g., other tools of MS 140, other management systems, or any other suitable source(s) of such control messages), and the like, as well as combinations thereof. In one embodiment, FMT 228 receives alarms that are triggered based on active monitoring of network performance.

In one embodiment, FMT 228 identifies congestion of a network element in response to reports of service problems received from mobile subscribers. For example, a mobile subscriber calling to complain about poor Quality of Service (QoS) or a Quality-of-Experience (QoE), may provide the telephone number of the UE, which will be used by the network manager to look up the IMSI number associated with the UE, which may then be captured at MS 140 and used by MS 140 to determine the network elements that are or were supporting sessions for that UE. In one such embodiment, TT 227 is invoked in order to trace the mobile session path of the UE of complaining mobile subscriber (e.g., based on the IMSI of the UE, as described with respect to TT 227), which provides an indication as to the network elements that are or were supporting sessions for the UE of the complaining mobile subscriber. In one embodiment, one or more of the mechanisms of FMT 228 is configured to communicate with one or more other management systems for receiving information adapted for use in providing the various enforcement functions.

Examples of Environments Supporting the Various Embodiments

Generally speaking, various embodiments enable a user, such as a user in a network operations center (NOC), utilizing a computer terminal or other user workstation with a graphical user interface (GUI) interact with the management system/software and thereby to "drill down" deeper from upper to lower hierarchical level path elements by displaying lower level path elements associated with upper level path elements selected by a user via a user interface.

In one embodiment, mobile session path information is displayed by generating a "sub-map" including only the network components that support the mobile session and displaying the generated sub-map. For example, where the graphical display of the wireless network includes many eNodeBs, SGWs, and PGWs, the sub-map for a mobile session will include only one of each of those elements, as well as the sessions between each of those elements, thereby highlighting which network elements of the wireless network are supporting the mobile session.

In this example, the sub-map may be displayed in any suitable manner (e.g., simultaneously in a window in a different portion of a window in which the wireless network is displayed, in a new window opened for purposes of displaying the sub-map, and the like). In this example, as in the previous example, the mobile session path, or even components and sub-components of the mobile session path (e.g., physical equipment, physical communication links, sub-channels on physical communication links, and the like), may be selectable such that, when selected by the user, the user is presented with additional mobile session path information associated with the mobile session.

From such examples, it will be appreciated that display of additional information associated with a mobile session path may be provided in any suitable manner (e.g., refreshing within the display window to include mobile session path information, opening a new window including mobile session path information, and the like, as well as combinations thereof).

Implementations of the various methods optionally yield logical and/or physical representations of one or more paths, underlying transport elements supporting the one or more paths, as wells as various protocols, hardware, software, firmware, domains, subnets, network element and/or subelement connections as discussed herein. Any of these physical and/or logical representations may be visually represented within the context of a graphical user interface (GUI). Moreover, the various interactions and correspondences between these physical and/or logical representations may also be visually represented, included representations limited to specific criteria, such as those representations "necessary to support a path", "necessary to support a client/customer", "associated with a single client/customer" and so on. Such graphical representations and associated imagery provide infrastructure views (i.e., from the perspective of one or more transport elements) or services views (i.e., from the perspective of one or more services) of the network in either a static or dynamic manner.

A computer suitable for use in performing the functions described herein may include, illustratively, a processor element (e.g., a central processing unit (CPU) and/or other suitable processor(s)), a memory (e.g., random access memory (RAM), read only memory (ROM), and the like), a management module/processor, and various input/output devices (e.g., a user input device (such as a keyboard, a keypad, a mouse, and the like), a user output device (such as a display, a speaker, and the like), an input port, an output port, a receiver/transmitter (e.g., network connection or other suitable type of receiver/transmitter), and storage devices (e.g., a hard disk drive, a compact disk drive, an optical disk drive, and the like)). In one embodiment, computer software code associated with methods for invoking the various embodiments can be loaded into the memory and executed by processor to implement the functions as discussed herein above. The computer software code associated with methods for invoking the various embodiments can be stored on a computer readable storage medium, e.g., RAM memory, magnetic or optical drive or diskette, and the like.

It should be noted that functions depicted and described herein may be implemented in software and/or in a combination of software and hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

Although primarily depicted and described herein with respect to embodiments in which the management capability is used for managing an LTE wireless network, it will be appreciated that the management capability may be used for managing other types of wireless networks, including, but not limited to, other types of 4G wireless networks, 3G wireless networks, 2.5G wireless networks, 2G wireless networks, and the like, as well as combinations thereof.

In one embodiment, for example, in which the management capability is used to manage a Code Division Multiple Access (CDMA) 2000 Evolution-Data Optimized (EVDO) network, the management capability may support management of the network from the IP core network to the Base Transceiver Station (BTS) to which the UE connects.

In one embodiment, for example, in which the management capability is used to manage a Universal Mobile Telecommunications System (UMTS) network, the management capability may support management of the network from the IP core network to the eNodeB to which the UE connects.

In one embodiment, for example, in which the management capability is used to manage a General Packet Radio Service (GPRS) network, the management capability may support management of the network from the IP core network to the Base Transceiver Station (BTS) to which the UE connects.

It will be appreciated that, since the management capability may be used to manage different types of wireless networks that employ different types of network elements, the LTE-specific terminology used herein in describing the management capability within the context of an LTE network may be read more generally. For example, references herein to PGWs of the LTE network (and, similarly, PDSNs in CDMA2000 EVDO networks, SGSNs in UMTS/GPRS networks, and the like) may be read more generally as core network gateways. For example, references herein to SGWs of the LTE network (and, similarly, RNCs in CDMA2000 EVDO and UMTS networks, BSCs in GPRS networks, and the like) may be read more generally as radio network controllers. For example, references herein to eNodeBs of the LTE network (and, similarly, BTSs in CDMA2000 EVDO and GPRS networks, eNodeBs in UMTS networks, and the like) may be read more generally as wireless access nodes. Similarly, other LTE-specific terminology used herein in describing the management capability within the context of an LTE network also may be read more generally.

In various embodiments, enhanced services are provided using one or both of the 7750 Service Router or 7705 Service Aggregator Router (SAR), both of which are manufactured by Alcatel-Lucent of Murray Hill, N.J.

The 7750 Service Router is adapted to facilitate and support paths between a large number of eNodeBs and a SGW, or between one or more 7705 SARs and a SGW.

The 7705 SAR is adapted to aggregate multiple eNodeBs into one focal point and relays the traffic back to a 7750 Service Router or a SGW. That is, 7705 SAR concentrates and supports traffic/paths between the aggregated eNodeBs and either or both of a 7750 Service Router or a SGW.

Either of the 7750 Service Router and 7705 SAR may be included within the various network topologies discussed above with respect to the various figures. For example, the 7750 Service Router may be used to implement the service aware routers/switches of the various Figures. Moreover, the various networks described in the Figures may be modified to include one or more 7705 SARs to aggregate multiple eNodeBs connected to the service aware routers/switches.

A network manager according any of the various embodiments may be implemented using the Model 5620 Service Aware Manager (SAM) manufactured by Alcatel-Lucent. The 5620 SAM implements various management functions suitable for use in, for example, a network operations center (NOC) supporting one or more a telecommunications networks, such as wireless telecommunications networks. The 5620 SAM provides an up to date view of each of the elements and sub-elements forming the managed network. All of these elements may be discovered by the 5620 SAM as discussed in more detail above.

A general implementation for network operators transitioning from a prior network management system to a service aware management system may comprise, illustratively, (1) adapting an existing network structure to include new functional elements to accomplish changing goals/needs of customers, such as adding new functional elements such as the 7750 Service Router and/or 7705 SAR switching elements between one or more SGWs and at least a portion of their respective eNodeBs; (2) discovering the various configuration, status/operating and connections information associated with all the network elements, sub-elements and links forming the network; (3) correlating the network infrastructure to the various paths supported within the network; and (4) managing the network infrastructure using the path-based management tools discussed herein.

Hint-Based Discovery of Unknown or Unmanaged Infrastructure

The various improvements discussed above provide increased management efficiency by correlating mobile services and the underlying transport elements supporting the mobile services during an improved discovery process. In particular, the various improvements discussed above are especially useful within the context of a highly complex and/or very large scale network comprising many network elements, many types of network elements, many configurations of the network elements and so on.

Portions of a network being managed may be unknown or unmanaged by the network management system. Some managed networks may have network elements or groups of network elements that are either unknown to the NMS, unmanaged by the NMS, or unmanageable by the NMS. In all of these cases, it is desirable to determine as much as possible about the network elements or groups of network elements so that they may become known to the NMS at some level, whether or not that level leads to the ability to provision, configure, monitor and/or manage in some manner.

An unknown portion of the network may be a portion of the network not yet "discovered" by the network management system. It may be the case that the unknown portion simply cannot be discovered due to incompatibilities with hardware, software, protocols and the like, such as with legacy network elements, proprietary network elements and the like. An unmanaged portion of the network may be a portion of the network that is managed by another entity, such as a third party network services provider supporting a portion of the network. That is, and unmanaged portion of the network is an unknown portion of the network under the controller management of another entity or service provider. In either case, it is beneficial to have some understanding of the topology of the transport layer elements within the unknown or unmanaged network portions.

In various embodiments, the service aware manager (SAM) operating as part of the network management system (NMS) augments standard discovery process within a network to provide a correlation of each and every network element and/or sub element to its corresponding supported path or mobile services. This additional discovery results in a database where all of the paths or mobile services supported by the network are correlated to each and every element within the network providing necessary support. In this manner, the NMS may rapidly adapt to any problems. For example, if a particular network element object fails, the mobile services correlated to that network element object are impacted and immediate action may be taken with respect to those particular mobile services. Similarly, if a particular mobile service fails or experiences some sort of QOS degradation, at least one of the network element objects correlated to that mobile service is likely to be the cause and, therefore, diagnostic and remedial action may be focused on those network element objects specifically correlated to the mobile service experiencing the QOS degradation. In both of these scenarios, the efficiencies gained by knowing which network elements or which mobile services require immediate attention requires a correlation of the network elements to those mobile services.

To provide such correlation, a correlation engine processes each of the objects available to it to determine the identity, capability, configuration and so on of the objects. The object may comprise network elements, links, protocols, interfaces, ports and so on. Generally speaking, an object for this purpose comprises any entity within a network that may be controlled or managed. The processing of the objects is directed towards discovering what the objects actually are and how they are configured. This discovery process includes verifying whether objects that have already been discovered have, in fact, been discovered correctly. This discovery process also includes determining which objects are likely to exist between already discovered objects. The discovery process is iterative in that for each new object selected for processing, a sequence of determinations or verifications is made with respect to the object as it relates to the existing objects that have been discovered. For example, if a mobile service pack possibly comprises a sequence of network elements and communications links therebetween, a correlation engine may simply step through each of the network elements and communications links in their likely sequence to verify that such objects do in fact support the mobile service. The size and accuracy of the object database assembled and used by the correlation engine increases as more objects are discovered/verified.

Generally speaking, a mobile service comprises a structure or wrapper containing a concatenated sequence of network elements and connectors. A Mobile Service may be defined in terms of a particular customer, a particular eNodeB, a particular APN and so on. A mobile service may include one or more instances of an EPS on a network element, such as one or more of an SGW or a PGW on a single or common network element. It is desirable to discover or otherwise determine the underlying network elements and connectors forming each mobile service.

Given a hint or other available discovery-related information, the mobile service component discovery process may be adapted to focus first on available physical link data, then on service access point data and so on. In particular, the use of hints provides a mechanism by which the discovery process is made more efficient by reducing the problem space associated with the discovery process, thereby focusing discovery efforts toward those network elements and subelements most likely to be present within an unknown or unmanaged network portion.

As discussed above with respect to FIG. 2, a topology Discovery Profile or template is an association of a path with a "hint" or other guidance indicative of a type of path, Mobile Service, segments forming the path or Mobile Service, types of nodes at the endpoint of the segments and so on. For example, a particular network operator may typically architect paths according to one of two or three standard techniques. In this case, the operator may provide a hint about the architecture pertaining to a path of interest.

A topology Discovery Profile or template is especially useful within the context of a trying to manage a cloud or unmanageable portion of a network, such as a portion of a network leased from a third party network provider. For example, to fill out service gaps within a network, a network operator may lease network services from a third party. Unfortunately, while the third party is obligated to provide the leased services according to a service-level agreement, the third party typically does not provide any ability for the network operator leasing the services to manage infrastructure within the third party network supporting the leased network services.

In one embodiment, the third party network operator providing the leased services provides hints or a profile/template indicative of the likely topology or infrastructure used to support the leased services. That is, the network operator provides services according to one or more of a finite number of topology options or infrastructure options. The network operator may provide this information to the lessee such that the service aware manager of the lessee may more clearly understand the particular infrastructure elements supporting the paths through the leased portion of its network.

For example, a network operator may indicate or "hint" that a particular S1-u corresponds to a particular Discovery Profile or template number, where each number represents a particular topology or infrastructure. For example, a first hint or template may provide that connections between an eNodeB and a SGW are provided by a specific number of segments or links, where each segment or link corresponds to a respective segment or link type, and where each of the segments or links interconnects eNodeBs, switches, routers and other network elements in a particular manner. For example, an operator hint or profile may indicate that a first segment is a pure routing segment, a second segment is a physical Link (e.g., LLDP will automatically provide a peer), a third segment is an E-Pipe (P2P L2VPN) and so on. Other hints or templates may provide different topologies, connections arrangements and the like.

Managing "Unknown" or "Unmanaged" Network Portions

Figure 7:
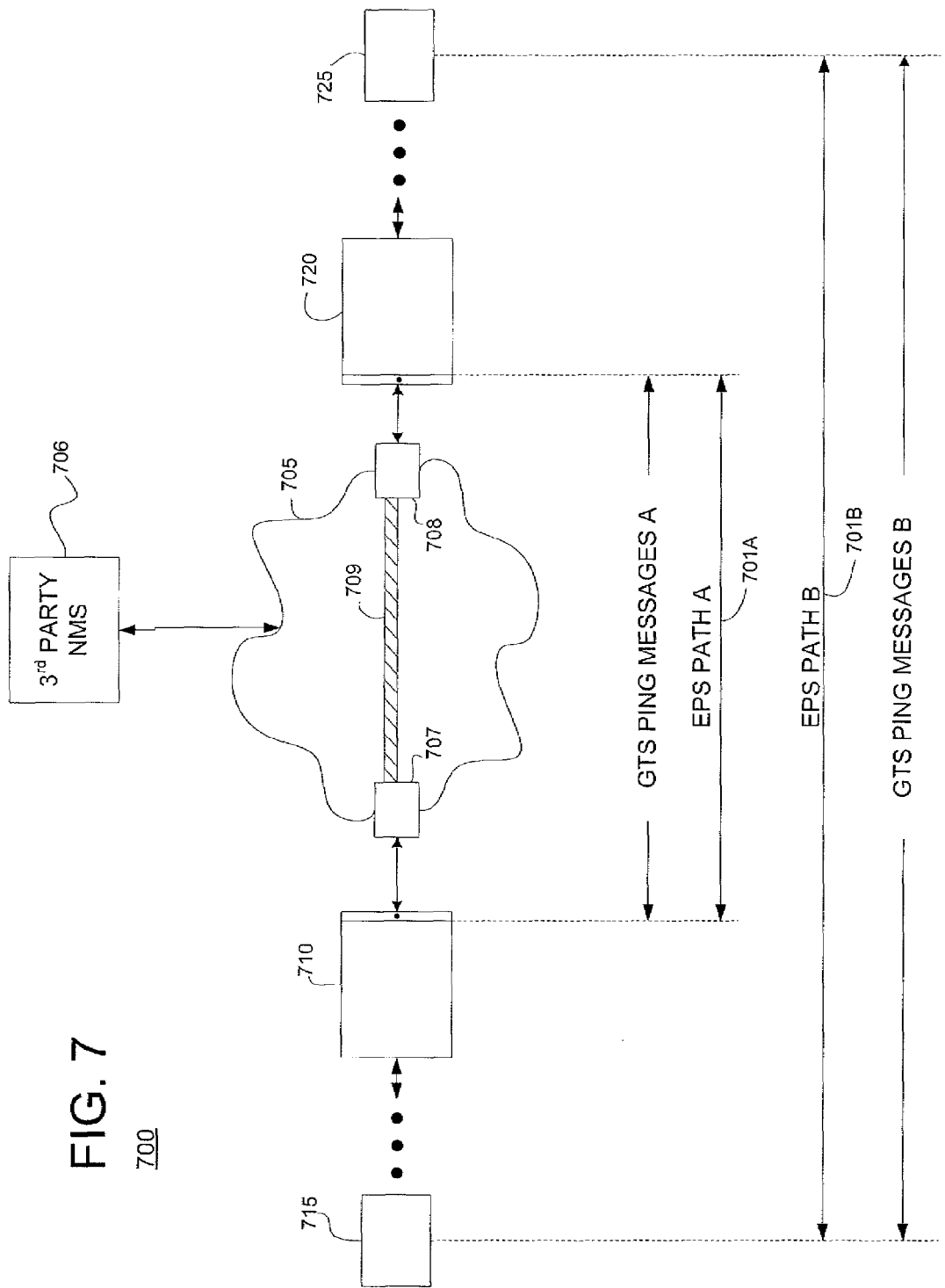
FIG. 7 depicts a high-level block diagram illustrating an EPS path traversing an unknown or unmanaged network.

FIG. 7 depicts a high-level block diagram illustrating one or more EPS paths traversing an unknown or unmanaged network. Specifically, FIG. 7 depicts one or more EPS paths 701 including a first managed network element 710 in communication with a second managed network element 720 via a unknown or unmanaged network 705.

The first 710 and second 720 managed network elements are managed by a network management system (NMS) associated with the service provider supporting the EPS path, such as described above with respect to FIGS. 1-6.

The network elements forming the unknown or unmanaged network 705 are managed by a third party NMS 706, which may or may not communicate with or share information with the service provider NMS associated. Even if the third party NMS 706 does share information with the service provider NMS, the shared information may be incomplete and/or unverifiable. Moreover, the shared information will likely not allow the service provider NMS to control or configure network elements associated with the network 705.

In the example of FIG. 7, the one or more EPS paths are communicatively supported via the first managed network element 710 and a first ingress/egress node 707 of the unknown or unmanaged network 705. Similarly, the one or more EPS paths are communicatively supported via the second managed network element 720 and a second ingress/egress node 708 of the unknown or unmanaged network 705. The unknown or unmanaged network 705 provides communication services between the two managed network elements 710/720 via a Service Tunnel (e.g., VLL-L2VPN-ePipe) that optionally uses GRE Tunnels or MPLS-LSPs as a transport layer. The Service Tunnel 709 is supported by first 707 and second 708 ingress/egress nodes at the edges of the unmanaged network 705. The Service Tunnel 709 is provisioned via the third party NMS 706 according to, illustratively, a service level agreement between the third party network owner and the service provider.

In the example of FIG. 7, a managing NMS component associated with the service provider such as a service aware manager (SAM) or other NMS component managing the one or more EPS paths manages the endpoints 710 and 720, as well as the rest of the managed network (not shown).

Unfortunately, from the perspective of the service provider SAM or other NMS component managing EPS path views, the unknown or unmanaged network 705 is represented as a black box. This black box representation does not provide a level of correlation between network elements/objects and the mobile services they support as described above with respect to FIGS. 1-6. In fact, there may be an inability on the part of the managing NMS component to determine even the type of transport layer elements supporting the paths through the third-party network. The third party is not going to give a management-level type of access to its network elements sufficient to allow discovery of its network elements and the correlation of discovered network elements to paths. These elements are simply unknown components supporting a third party services purchase, which purchase is generally satisfied by the Service Tunnel 709 provided by the third party network 705.

In various embodiments, Network Elements 710 and 720 are EPC network elements (e.g., SGW, PGW, MME and the like), then an EPS Path 701A is provided between, and terminating at, the Network Elements 710 and 720. In this case, GTP Ping Messages associated with EPS Path 701A may be transmitted between Network Elements 710 and 720.

In various embodiments, Network Elements 710 and 720 are Routers or Other Switching Devices (e.g., non-EPC Network Elements) that are present as part of a segment between two remote EPC network elements 715 and 725, then an EPS Path 701B is provided between, but not terminating at, the Network Elements 710 and 720. In this case, GTP Ping Messages B EPS Path 701B may be transmitted between the two remote EPC nodes 715 and 725 (i.e., through Network Elements 710 and 720) as part of the EPC Path 701B. Further, in these embodiments other types of Ping Messages suitable for use between such intermediate network elements may be used, such as ICMP Ping messages.

The managing NMS component views the unknown or unmanaged network portion solely within the context of a service level agreement (SLA) associated with the unknown or unmanaged network. Specifically, the SLA between a service provider having its own managed network and using the managing NMS component and a third party supporting the unknown or unmanaged network will define the number and types of communications links passing through the third-party network, the quality of service levels associated with those links and so on. Generally speaking, the SLA addresses the particular services offered by the third-party network provider without giving access to or even an understanding of the underlying infrastructure supporting the contracted for services.

Since the specific network elements or objects within the third-party network are unknown to the managing NMS component, such network elements or objects cannot be individually managed by the managing NMS component. As such, some of the benefits and functions described above with respect to the SAM are difficult or impossible to implement within the context of EPS path traversing third-party networks. For example, the SAM cannot correlate the individual transport element forming a third party service to the paths that traverse the third-party service. The only level of correlation possible is the generic black box type correlation, which is not sufficiently granular for use in fault tracing, drill down discovery and other functions now possible with the use of the SAM. Further, absent a correlation to the transport layer elements, customers must rely on error and/or status messages provided by the third party service provider to determine the health of the mobile services supported by the third party service provider.

The paradigm of a black-box view of third-party network portions within the context of SAM-accurate managing of network elements may be too slow in practice and inherently prevents true end-to-end management of the mobile services that end up traversing the third party portion of the network. A service provider customer will not get the advantage of the new techniques unless the customer can properly correlate to the third party equipment.

Therefore, it is seen to be desirable to provide an improved or at least more detailed view of the unknown or unmanaged network portion so that the specific EPS path management functions provided by a managing NMS component such as SAM may be employed by the NMS.

Managing Unknown or Unmanaged Network Portions

Within the context of managing or discovering transport layer elements associated with an unknown or "unmanaged" network (e.g., an unknown or unmanaged portion of a L2/L3 network), a first or default set of hints is provided to assist in the discovery/management functions. The default set of hints represents, in one example, a set of likely or expected set of topologies to be used within the unknown network. Specifically, even though a third party will not grant management control or access to its network elements, it can provide hints about how its network elements are configured. For example, one third party service provider may build its network primarily according to any of four usual topologies. Alternatively, assumptions or experience with the third party network may be used to determine an initial or default set of hints. Generally speaking, whether explicitly provided by the third party network or determined in response to assumptions about the third party network, these hints are used in various embodiments to determine the likely transport layer elements or portions thereof within the third party network that support our customer's mobile services. Hints or hint data may take many forms, as will be explained in more detail below.

Within the context of various embodiments, the discovery and correlation processes described above with respect to FIGS. 1-6 operate to discover any discoverable transport layer network elements within the service provider network and third-party network, and correlate the discovered transport layer network elements to the corresponding mobile services or paths supported by the discovered transport layer network elements.

In one embodiment, the correlation engine further processes hint data to improve the discovery and correlation process associated with transport layer network elements within third-party or unknown or unmanaged networks. Where transport layer network elements are within the service provider's network, the correlation will be correct. Where transport layer network elements are within a third party or unknown or unmanaged network, the correlation will likely have one or more ambiguities associated with it. Each ambiguity has a probability of being correct (i.e., a confidence level). In various embodiments, the discovery process is iterated to improve the confidence level until a minimum or threshold confidence level is achieved.

Initial Discovery Process

In one embodiment, initial discovery and correlation processes are performed as described above with respect to FIGS. 1-6. This results in a correlation between the paths and the underlying transport elements supporting the paths with 100% certainty in the service provider's own network.

Third Party Network Discovery Process

For a third party supplied network portion or other unknown or unmanaged network portion supporting a service provider or its customer's paths, one embodiment of the discovery process also includes determining if any ambiguities exist in the correlation between TL elements and paths, the impact of such ambiguities on the confidence level of the discovered network topology, and the application of one or more mechanisms to diminish the ambiguities and/or improve the confidence level of the discovered network topology.

Figure 8A:
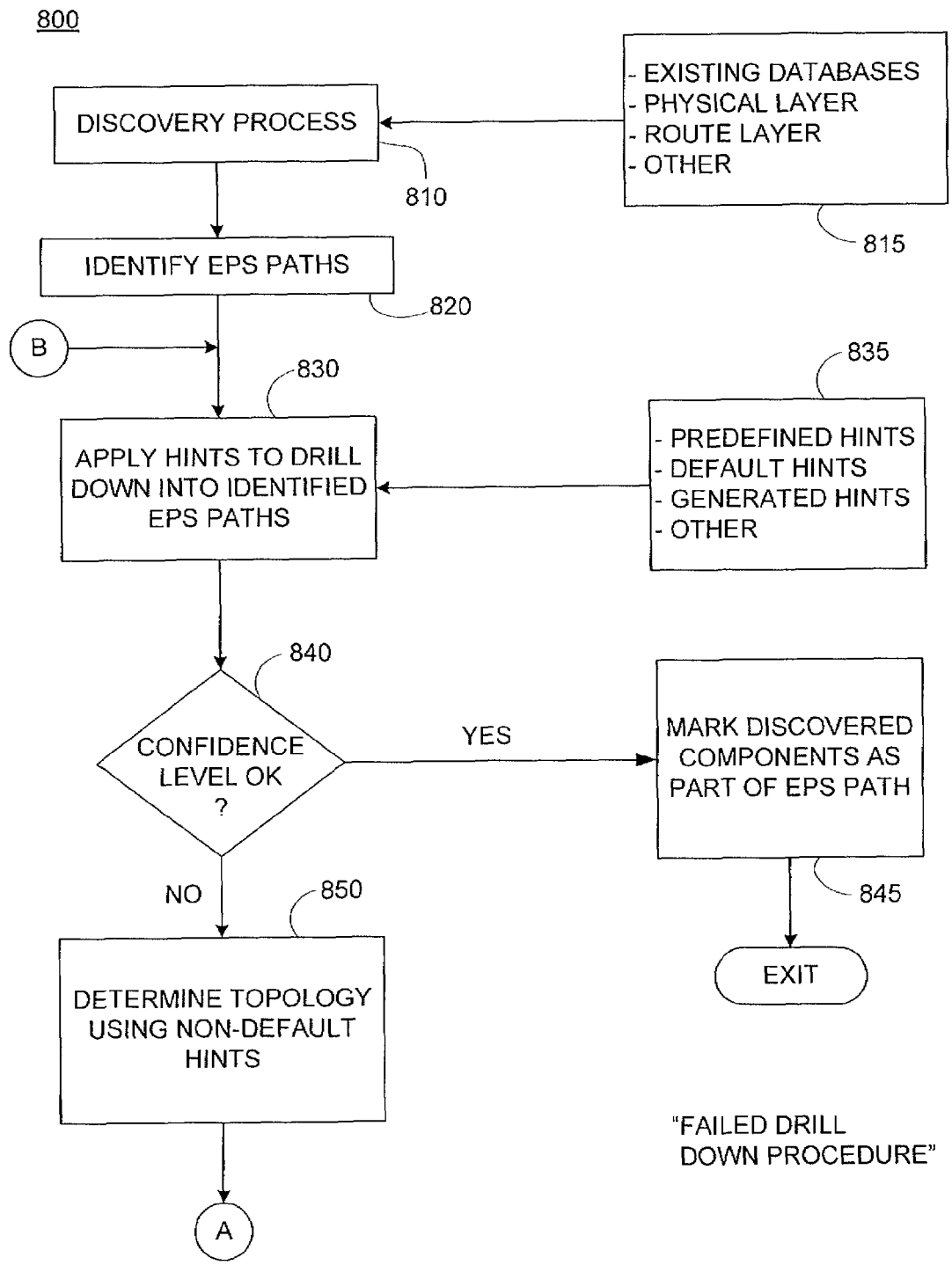
FIG. 8 depicts a flow diagram of a method of hint-based discovery of infrastructure supporting EPS paths according to one embodiment.
Figure 8B:
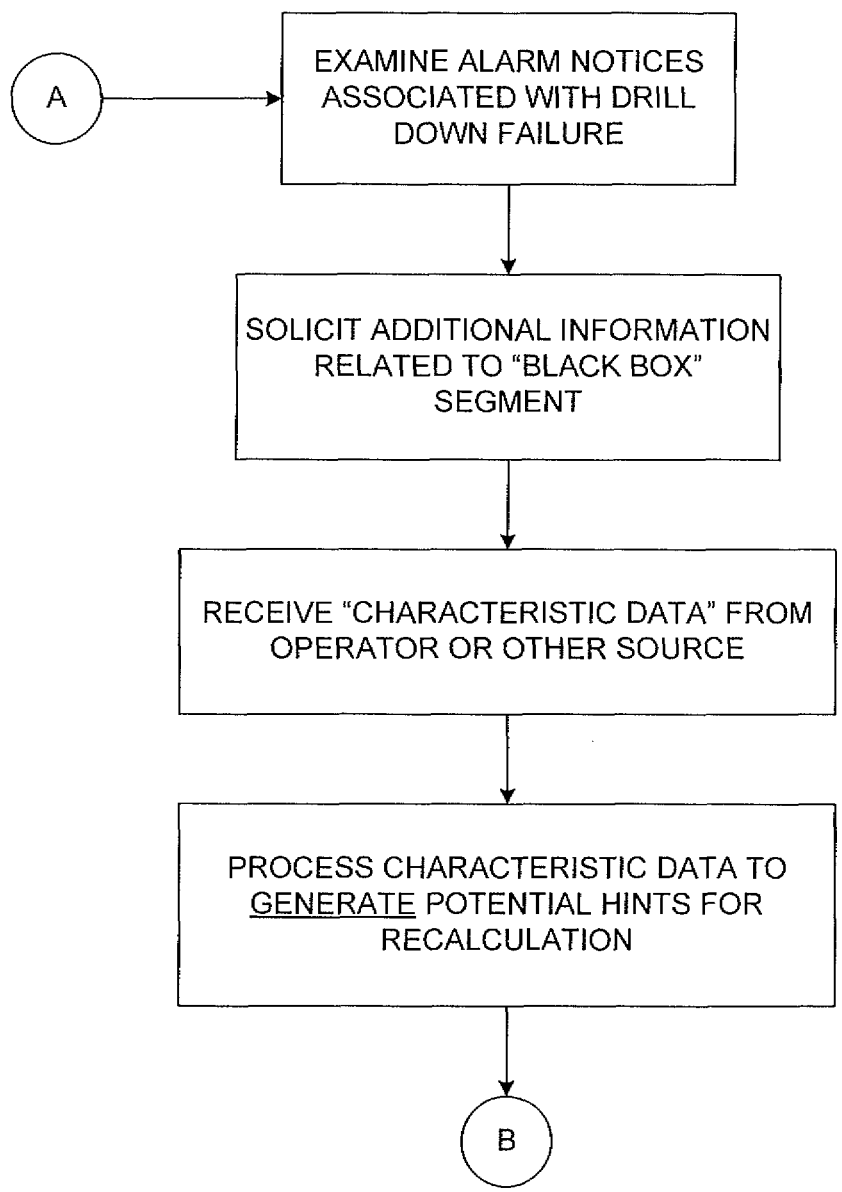

FIG. 8 depicts a flow diagram of a method of hint-based discovery of infrastructure supporting EPS paths according to one embodiment. Specifically, the method of 800 of FIG. 8 is executed by equipment or processes within the context of network discovery, such as the above-described service aware manager (SAM) used within the context of a network management system (NMS).

At step 810, the discovery process, referring to box 815, the discovery process may employ existing databases, physical layer discovery techniques, route layer discovery techniques and other techniques. This discovery process may be implemented according to any of the techniques described above with respect to FIGS. 1-6.

At step 820, EPS paths associated with unmanaged or blackbox portions of the network are identified.

At 830, hints are applied to the discovery process in an attempt to drill down to the transport layer elements in an identified EPS path. Referring to box 835, the hints may comprise predefined hints, default hints, generated hints and or other types of hints or information. Generally speaking, the predefined or default hints are initially applied to a particular EPS path being drilled down into, with the generated hints and other data subsequently applied where the EPS path supporting transport layer elements have not been identified with sufficient certainty.

At step 840, a determination is made as to whether the confidence level of the correlation between the EPS path and transport layer elements within the unmanaged network exceeds a minimum confidence level. If so, then at step 845 the discovered components within the unmanaged network are marked as part of the EPS path and the method exits. Refer to the description of step 530 above.

If the minimum confidence level is not reached at step 840, then at step 858 a "failure to drill down procedure" is invoked wherein the topology/component of the unmanaged portion of the network must be determined using non-default hints.

At step 860, alarm notices associated with the drill down failure are examined to try and identify specific component sources of the alarm notices and other information indicative of potential components forming the EPS path.

At step 870, additional information is solicited relating to the "blackbox" segment to which the potential EPS path traverses. Such solicitation may be made to the third-party owner or operator of the unmanaged network portion and the like.

At step 880, the "characteristic data" associated with the blackbox segment component is received from the third-party operator or other source.

At step 890, the characteristic data is processed to generate thereby new potential hints suitable for use in the discovery process.

The method 800 iteratively repeats steps 830-890 using the generated hints until each EPS path traversing the unmanaged network portion is identified and its components marked as discovered. In the event that the various components or objects forming a particular EPS path cannot be discovered with sufficient certainty, that EPS path may be managed individually as a blackbox path.

Specifically, for any path, there may be ambiguities associated with the type of network elements supporting the path, the connections between these elements (e.g., links used, ports used), the configuration of the elements and so on. For each ambiguity identified, a probability of a particular resolution of the ambiguity is assigned (e.g., a probability of the ambiguity been resolved as a particular network element type, a particular communications link, a particular port on a network element and so on). For each path, a confidence level is calculated based upon the probabilities of the ambiguities related to the path. The confidence level of the path is improved by iteratively processing the discovered correlation data using hint data until the path confidence level is greater than or equal to a minimum or threshold confidence level.

In one embodiment, methods include the iterative processing of path, transport layer and/or hint data to provide correlation data where path confidence exceeds a threshold confidence level. In one embodiment, an apparatus comprises a correlation engine operative to process the path, transport layer and hint data. The method and apparatus may be invoked within or under the control of a network operations center (NOC) or other network management system.

Specific types of hint data may be used, including:

(1) Typical or expected third party topology (e.g., use of specific switching elements, ports etc. in a standard manner). For example, a third party may deploy specific switching elements in a relative consistent manner across the third party networks. This hint data may take the form of a default or generic hint.

(2) Known deviations from an expected third party topology due to geographic, service class, technology class or other unique situation. For example, the typical or expected third party topology may necessarily be deviated from in the case of networks acquired from other service providers, networks in different geographic areas, networks having different levels of capability and so on. This hint data may take the form of a modified default or generic hint.

(3) Specific hints provided by the third-party provider to enable correlation between EPS paths traversing the third-party network and network elements, communications links and so on within the third-party network.

(4) Hints generated automatically or manually by system operators based upon their own experience with the topology to be discovered.

The hint data provided by a third party or generated by system operator may take any form useful for this purpose. For example, in various embodiments network management systems use Managed Objects (e.g., Java Objects) that represents potential elements that could be found (Physical Link, Port, Service, Router, Unmanaged L3 Network, VLAN, Epipe, VPLS, VPRN, SAP and so on). Thus, since each of the potential elements or subelements associated with a mobile service component may be clearly identified, a mobile service comprising a plurality or sequence of such elements or subelements may be described by concatenating a sequence of element or sub element identifiers possibly representing components supporting a mobile service.

Thus, in various embodiments, a hint comprises a regular expression including a plurality of concatenated managed object identifiers possibly representing components supporting a mobile service. It is noted that other formats and hint structure are contemplated by inventors, such as MPLS LSP, VPRN (2547bis), Routed Network (pure IP), IP Link, VLAN path/service, IPsec Tunnel, IPsec VPN Service) and so on.

For example, if an unknown or unmanaged network portion is typically configured as a port, followed by a physical link, followed by an E pipe, Each of these potential elements is described as a regular expression We then make a chain of them and that becomes the hint (Port-Physical Link-Epipe-VPLS-SAP-Physical Link-Port . . . for example). That information is saved in the SAM Database, but of course, this can be exported through our OSS Interface (North Bound Interface) in an XML format stream or a text file.

As a first example, assume that a hint is defined by the following regular expression: "Hint1=PL, SAP, epipe, SAP".

This first hint implies that an unknown or unmanaged network portion is typically configured as a physical link (PL), followed by a Service Access Point (SAP), followed by an epipe, followed by another SAP.

As a second example, assume that a hint is defined by the following regular expression: "Hint2=PL, unmanaged L3 network, PL"

This second hint implies that an unknown or unmanaged network portion is typically configured as a PL, followed by an unmanaged L3 network, followed by a PL.

Within the context of managing or discovering transport layer elements associated with an unknown or unmanaged network (e.g., an unmanaged L2/L3 network), a first or default set of hints is provided to assist in the discovery functions. The default set of hints represents, in one example, a number of default topologies used by the owner of the third-party network to configure that network. Specifically, if the third-party network provider builds its network according to one of four different topologies, then information defining these four different topologies comprises four initial hints for use by the SAM in discovering network objects or structure within the unmanaged network useful in managing the customer's mobile services.

In one embodiment, the correlation engine initially discovers the unmanaged network as a "black box" that links two or more managed elements. The default hints associated with the unmanaged networks are then processed by the correlation engine to provide a number of possible implementations of transport layer elements forming the unmanaged network. For example, default hints may contemplate a specific topology comprising network elements, communications links, protocols, interfaces and the like within the unknown or unmanaged network.

Each element within this specific topology, as well as the topology itself, is associated with a respective confidence level or statistical indication of the likelihood of its being correct. The correlation engine iteratively processes the default hints/topologies to identify which of the default hints/topologies is the one most likely to be accurate. This processing may include injecting test vectors or other data into the unmanaged network portion to trigger specific responses from the unmanaged network indicative of particular objects forming the unmanaged network. Other techniques may also be employed to identify specific subelements and elements within the unmanaged network.

After identifying prospective network elements within the unmanaged network portion that support an EPS path, the correlation engine discovers the sequence of elements likely used to form the EPS path. That is, the standard discovery process discussed with respect to the prior patent applications is used within the context of testing EPS path representations associated with a hypothesized or hinted at topology. Each element and subelement contemplated by the correlation engine has associated with it a respective confidence level. The sequence of confidence levels associated with the corresponding sequence of elements/subelements potentially supporting the EPS path resolves into a confidence level associated with the potentially discovered EPS path itself. When a confidence level exceeds a threshold level (e.g., 90%), then the "discovered" network layer elements supporting EPS path are deemed to have been discovered.

The above-described methodology is adapted to minimize the number of EPS paths managed in a black-box manner. In various embodiments, the hints are used by the service aware manager to discover, to the extent possible, the specific network elements/objects within the unknown or unmanaged portion of the network supporting the mobile services passing therethrough or supported thereby. Generally speaking, the mechanism iteratively processes each of the network elements or portions thereof forming the third-party network to reduce, to the extent possible, the need to manage such network elements or portions thereof in a black-box manner. In this manner, ambiguities associated with the third-party network elements and the EPS paths they support are reduced, which production and acuity improves management efficiency associated with the services provided.

While primarily discussed above with respect to the unknown network or unmanaged network scenarios, various embodiments are adapted for use within the context of known or managed network portions. For example, various embodiments utilize hint-based processing and/or confidence levels to make informed guesses as to specific network elements, subelements and the like to determine (with fewer iterations) the mobile service building blocks associated with the known or managed portions of a network. These default or generic hints may be provided by accessing the mobile service components themselves, by the manufacturer of the mobile service components, by database associated with known components and/or component manufacturers associated with the network and so on. Essentially, these hints may comprise the modifications of the default a generic hints adapted for use in special cases. These hints may also be provided to the network management system via policy updates or other mechanisms.

Figure 9:
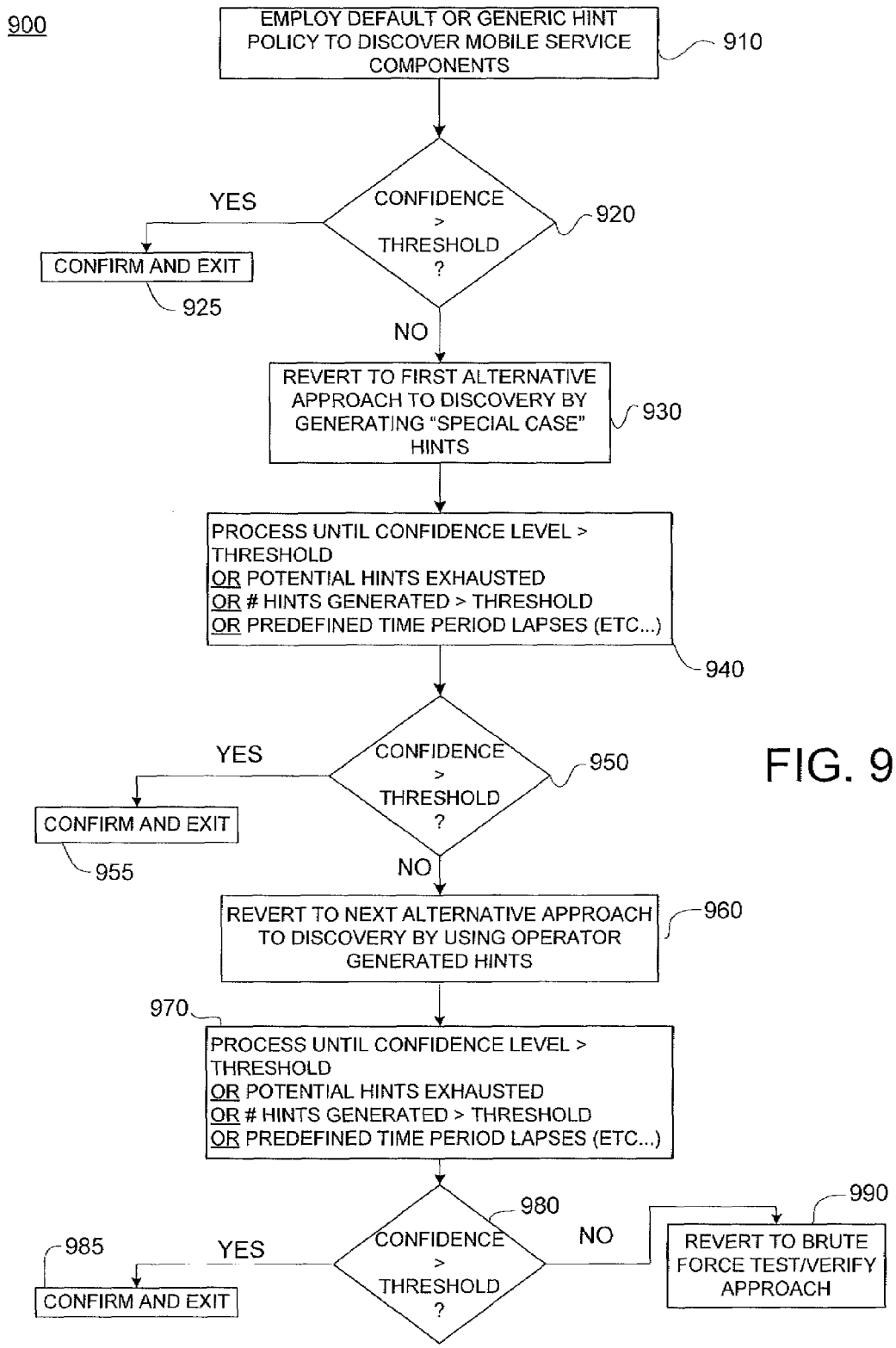
FIG. 9 depicts a flow diagram of a method of hint-based discovery of infrastructure supporting mobile services according to one embodiment.

FIG. 9 depicts a flow diagram of a method of hint-based discovery of infrastructure supporting mobile services according to one embodiment. Specifically, the method 900 of FIG. 9 is particularly adapted for use within the context of discovering a mobile service components within a managed network, wherein such discovery is improved inefficiency using the hint-based techniques discussed herein.

At step 910, default or generic hint policies are employed to discover the various mobile service components. Specifically, the discovery processes discussed above with respect to FIGS. 7 and/or 8 are employed to attempt to discover the various mobile service components using one or more hints from, illustratively, a pool of default hints.

At step 920, a determination is made as to whether a confidence level associated with the mobile service components discovered at step 910 exceeds a threshold level. If the threshold level is exceeded, then at step 925 the discovered mobile service components are confirmed and the method is exited. If the threshold level is not exceeded, then the method 900 proceeds to step 930.

At step 930, the method 900 reverts to a first alternative approach to discovery by generating multiple "special case" hints which are then processed in an attempt to discover the various mobile service components. These "special case" hints may comprise variations of the default or generic hints used at step 910, where the variations are triggered by specific conditions associated with the mobile service components to be discovered. Such specific conditions may comprise, illustratively, known deviations from an expected topology due to geographic, service class, technology class or other unique situation. These hints may be provided by accessing the mobile service components themselves, by the manufacturer of the mobile service components, by database associated with known components and/or component manufacturers associated with the network and so on. Essentially, these hints may comprise the modifications of the default or generic hints adapted for use in special cases. These hints may also be provided to the network management system via policy updates or other mechanisms. Specifically, the discovery processes discussed above with respect to FIGS. 7 and/or 8 are employed to attempt to discover the various mobile service components using one or more hints from, illustratively, a pool of special hints.

At step 940, the processing of step 930 is continued until a confidence level associated with the mobile service components discovered at step 930 exceeds a threshold level, or the "special case" hints potentially applicable to the mobile service components to be discovered have been exhausted, or a predefined number of special case hands have been generated and processed (i.e., a number of hints exceeding a threshold number), or a predefined time period has elapsed.

At step 950, if the confidence level associated with the mobile service components discovered it steps 930-940 exceeds a threshold level, then at step 955 the discovered mobile service components are confirmed and the method is exited. Otherwise the method proceeds to step 960.

At step 960, the method 900 reverts to a second alternative approach to discovery by using operator generated hints. These operator generated hints may comprise hints based upon the experience of the network operator in discovering mobile service components, hints based upon the topology associated with previously discovered mobile service components proximate with or similar to the mobile service components to be discovered and so on.

At step 970, the processing of step 960 is continued until a confidence level associated with the mobile service components discovered at step 930 exceeds a threshold level, or the operator generated hints potentially applicable to the mobile service components to be discovered have been exhausted, or a predefined number of operator generated hints have been generated and processed (i.e., a number of hints exceeding a threshold number), or a predefined time period has elapsed.

At step 980, if the confidence level associated with the mobile service components discovered it steps 960-970 exceeds a threshold level, then at step 985 the discovered mobile service components are confirmed and the method is exited. Otherwise the method proceeds to step 990.

At step 990, the method 900 reverts to a third alternative approach to discovery such as a brute force (i.e., resource intensive) methodology wherein test information is processed through known elements or sub elements in communication with the mobile service components to be discovered to characterize and/or verify the operation of the mobile service components be discovered. This process is iterated as necessary.

While discussed above as a sequence of default hint processing (step 910), first alternative or special hint processing (step 930), second alternative or operator generated hint processing (step 960) and brute force discovery (step 990), it will be appreciated by those skilled in the art that the particular order in which the various steps are performed can be changed. For example, in some embodiments one or both of the first and second alternative hint processing steps are not used. In other embodiments, the first and second alternative hint processing steps are performed in reverse order. In other embodiments, the default hint processing step is not used. Various other embodiments are also contemplated by the inventors.

As an example, assume that company X has 1000 Mobile Services and that 990 of them are provisioned in a manner corresponding to a Default (or Generic) Hint policy. The confidence level for all of them should be near (if not) 100%. The 10 mobile Services that are different will have levels below 100%. In this embodiment, the NMS is programmed (or configured) to determine that a confidence level below, illustratively, 80% is associated with an error or other alarm condition such that a first alternative discovery approach is used.

For example, the first alternative discovery approach may comprise generating or accessing a previously generated list of hints adapted to fit the appropriate "special" cases of the mobile service components to be discovered. As long as the confidence level is less that the threshold level then new potential hints are generated. After the potential hints are exhausted, or after a predefined number of potential hints are tried, the embodiment may revert to a second alternative discovery approach.

For example, the second alternative discovery approach may comprise the operator automatically generating or manually building one or more appropriate hints based upon operational knowledge associated with the network and/or the various mobile service components.

In one embodiment, if at any point and automatically generated or manual built hint provides a satisfactory Confidence level from the remaining Mobile Services, it will be saved and will be considered as a secondary Default Hint (promotion of hints) and will be used as part of the original sets of hints against the unprocessed Mobiles Services (the other 9 from the original example). That is, an automatically generated and/or manually built can't that proves successful in discovering mobile service components is saved or otherwise included or promoted for use within either or both of the default or generic hints and the special case default or generic hints.

The various embodiments are primarily described herein with respect to LTE networks. However, it will be appreciated by those skilled in the art that the teachings of the present embodiments have broader applicability to other types of wireless and wireline networks. That is, unknown network portions of any type of network may be associated with or characterized by hints provided by manufacturers, systems operators and the like. For example, rather determining or discovering the specific network elements or subelements of an LTE network supporting an EPS Path or Mobile Service, the various hint-based embodiments may be employed to identify specific transport layer infrastructure supporting, illustratively, a Service Tunnel for a VPLS (L2VPN) service or other non-LTE service.

In various embodiments, a topology Discovery Profile or template provides the association of a path with a "hint" or other guidance indicative of a type of path, Mobile Service, segments forming the path or Mobile Service, types of nodes at the endpoint of the segments and so on. The Discovery Profile may be defined and otherwise conveyed to an NMS, Element Management System (EMS) or Network Element via a policy update mechanism or other mechanism. The Discovery Profile or template may be built into a Network Element according to a standard data structure that is active during, for example, a self discovery or self optimizing operation.

Although various embodiments which incorporate the teachings of the present invention have been shown and described in detail herein, those skilled in the art can readily devise many other varied embodiments that still incorporate these teachings.

What is claimed is:

1. A method for managing a network, the network including managed network elements and unknown network portions, the method comprising:
    identifying a path supported by one or more unknown network portions;
    applying at least a first hint to determine a topology associated with said one or more unknown network portions; and
    if a confidence level associated with said determined topology exceeds a threshold level, storing, in a non-transitory computer readable storage medium, data representing at least a portion of network element information and network element connections information of said determined topology.

2. The method of claim 1, wherein if a confidence level associated with said determined topology does not exceed the threshold level, applying at least a second hint to determine a topology associated with said one or more unknown network portions.

3. The method of claim 2, wherein said first hint is different than said second hint.

4. The method of claim 2, wherein said first hint comprises one of a predefined hint and a default hint, and said second hint comprises a non-default hint.

5. The method of claim 1, wherein said one or more unknown network portions are associated with a third party network, and said first hint defines a topology normally associated with said third party network.

6. The method of claim 1, wherein said one or more unknown network portions are unmanaged portions of the network, and said first hint is provided during a network discovery function.

7. The method of claim 6, wherein said first hint defines a topology normally associated with said network.

8. The method of claim 7, wherein said network comprises a non long term evolution (non-LTE) network and said first hint defines transport layer infrastructure associated with a Virtual Private Local Area Network (LAN) Service (VPLS) or a Layer 2 Virtual Private Network (L2VPN) service supporting a service tunnel.

9. The method of claim 1, wherein said first hint is provided by a third party network.

10. The method of claim 1, wherein said first hint comprises at least one of a network element type, a network element configuration, a network element interconnection type, or a network element interconnection configuration.

11. The method of claim 10, wherein said first hint comprises a regular expression defining a concatenated sequence of network elements and/or connectors.

12. The method of claim 1, further comprising using said determined topology to identify elements within the network that are necessary to support the path.

13. The method of claim 1, wherein the network comprises a long term evolution (LTE) network including Evolved Packet Core (EPC) network elements and Evolved NodeBs (eNodeBs) operating as Evolved Packet System/Solution (EPS) nodes.

14. The method of claim 1, further comprising iteratively determining topologies associated with said one or more unknown network portions using default hints from a pool of default hints until a confidence level associated with a determined topology exceeds said threshold level.

15. The method of claim 14, further comprising:
    terminating said iterative determining of topologies using default hints in response to an exhaustion of said pool of default hints; and
    iteratively determining topologies associated with said one or more unknown network portions using special hints from a pool of special hints until a confidence level associated with a determined topology exceeds said threshold level.

16. The method of claim 15, further comprising:
    terminating said iterative determining of topologies using special hints in response to an exhaustion of said pool of special hints; and
    iteratively determining topologies associated with said one or more unknown network portions using operator generated hints until a confidence level associated with a determined topology exceeds said threshold level.

17. The method of claim 15, further wherein said operator generated hints comprise one or both of automatically generated hints and manually generated hints.

18. The method of claim 1, wherein said first hint comprises a regular expression identifying a sequence of objects representing a potential topology.

19. A non-transitory computer-readable storage medium storing instructions which, when executed by a computer, cause the computer to perform steps for managing a network, the network including managed network elements and unknown network portions, the steps comprising:
    identifying a path supported by one or more unknown network portions;
    applying at least a first hint to determine a topology associated with said one or more unknown network portions; and
    if a confidence level associated with said determined topology exceeds a threshold level, storing, in a computer readable memory, data representing at least a portion of network element information and network element connections information of said determined topology.

20. Apparatus for managing a network, the network including managed network elements and unknown network portions, the apparatus comprising:
    a memory storing instructions; and
    a processor communicatively connected to the memory, wherein the processor is configured to execute the instructions for:
        identifying a path supported by one or more unknown network portions;

applying at least a first hint to determine a topology associated with said one or more unknown network portions; and if a confidence level associated with said determined topology exceeds a threshold level, storing, in the memory, data representing at least a portion of network element information and network element connections information of said determined topology.

\* \* \* \* \*